(12) United States Patent
Chaudhari et al.

(10) Patent No.: US 12,462,290 B2
(45) Date of Patent: Nov. 4, 2025

(54) UTILIZING ADDITIVE DECOMPOSITION FOR UNIVERSAL OFF-POLICY EVALUATION OF DIGITAL CONTENT SLATE RECOMMENDATIONS

(71) Applicant: Adobe Inc., San Jose, CA (US)

(72) Inventors: Shreyas Chaudhari, Amherst, MA (US); Nikolaos Vlassis, San Jose, CA (US); Georgios Theocharous, San Jose, CA (US); David Arbour, San Jose, CA (US)

(73) Assignee: Adobe Inc., San Jose, CA (US)

( * ) Notice: Subject to any disclaimer, the term of this patent is extended or adjusted under 35 U.S.C. 154(b) by 155 days.

(21) Appl. No.: 18/530,907

(22) Filed: Dec. 6, 2023

(65) Prior Publication Data
US 2025/0191047 A1    Jun. 12, 2025

(51) Int. Cl.
*G06Q 30/00* (2023.01)
*G06Q 30/0601* (2023.01)

(52) U.S. Cl.
CPC ................. *G06Q 30/0631* (2013.01)

(58) Field of Classification Search
None
See application file for complete search history.

(56) References Cited

PUBLICATIONS

Audrey Huang, Liu Leqi, Zachary Lipton, and Kamyar Azizzadenesheli. 2021. Off-policy risk assessment in contextual bandits. Advances in Neural Information Processing Systems 34 (2021), 23714-23726.

Badrul Sarwar, George Karypis, Joseph Konstan, and John Riedl. 2000. Analysis of recommendation algorithms for e-commerce. In Proceedings of the 2nd ACM Conference on Electronic Commerce. 158-167.

Carlos A Gomez-Uribe and Neil Hunt. 2015. The netflix recommender system: Algorithms, business value, and innovation. ACM Transactions on Management Information Systems (TMIS) 6, 4 (2015), 1-19.

(Continued)

*Primary Examiner* — Mila Airapetian
(74) *Attorney, Agent, or Firm* — Keller Preece PLLC

(57) ABSTRACT

The present disclosure relates to systems, non-transitory computer-readable media, and methods for performing off-policy evaluations of slate recommendation policies through additive decomposition. In particular, in one or more embodiments, the disclosed systems receive historical data corresponding to digital slate recommendations performed by a first slate recommendation policy, with each slate recommendation comprising a plurality of digital slot recommendations. Additionally, in some embodiments, the disclosed systems generate a second slate action using a second slate recommendation policy conditioned on user context. Further, in some embodiments, the disclosed systems generate a plurality of importance weights by summing a plurality of slot-level density ratios generated by comparing the slate actions of the second slate recommendation policy to the slate actions of the first slate recommendation policy. In some embodiments, the disclosed systems apply the plurality of importance weights to generate a predicted reward distribution for evaluation of the second slate recommendation policy.

20 Claims, 12 Drawing Sheets

(56) References Cited

PUBLICATIONS

Chris Burges, Tal Shaked, Erin Renshaw, Ari Lazier, Matt Deeds, Nicole Hamilton, and Greg Hullender. 2005. Learning to rank using gradient descent. In Proceedings of the 22nd international conference on Machine learning. 89-96.

Daniel G Horvitz and Donovan J Thompson. 1952. A generalization of sampling without replacement from a finite universe. Journal of the American statistical Association 47, 260 (1952), 663-685.

Daphne Koller and Nir Friedman. 2009. Probabilistic graphical models: principles and techniques. MIT press.

Dror G Feitelson, Eitan Frachtenberg, and Kent L Beck. 2013. Development and deployment at facebook. IEEE Internet Computing 17, 4 (2013), 8-17.

Ehtsham Elahi and Ashok Chandrashekar. 2020. Learning representations of hierarchical slates in collaborative filtering. In Proceedings of the 14th ACM Conference on Recommender Systems. 703-707.

F Maxwell Harper and Joseph A Konstan. 2015. The movielens datasets: History and context. Acm transactions on interactive intelligent systems (tiis) 5, 4 (2015), 1-19.

Guy Shani and Asela Gunawardana. 2011. Evaluating recommendation systems. In Recommender systems handbook. Springer, 257-297.

Harald Steck. 2019. Embarrassingly shallow autoencoders for sparse data. In The World Wide Web Conference. 3251-3257.

Haruka Kiyohara, Yuta Saito, Tatsuya Matsuhiro, Yusuke Narita, Nobuyuki Shimizu, and Yasuo Yamamoto. 2022. Doubly robust off-policy evaluation for ranking policies under the cascade behavior model. In Proceedings of the Fifteenth ACM International Conference on Web Search and Data Mining. 487-497.

Jason M Altschuler, Victor-Emmanuel Brunel, and Alan Malek. 2019. Best Arm Identification for Contaminated Bandits. J. Mach. Learn. Res. 20, 91 (2019), 1-39.

Jesús Bobadilla, Fernando Ortega, Antonio Hernando, and Abraham Gutiérrez. 2013. Recommender systems survey. Knowledge-based systems 46 (2013), 109-132.

Jie Lu, Dianshuang Wu, Mingsong Mao, Wei Wang, and Guangquan Zhang. 2015. Recommender system application developments: a survey. Decision support systems 74 (2015), 12-32.

Julia L Wirch and Mary R Hardy. 2001. Distortion risk measures: Coherence and stochastic dominance. In International congress on insurance: Mathematics and economics. 15-17.

Kalervo Järvelin and Jaana Kekäläinen. 2017. IR evaluation methods for retrieving highly relevant documents. In ACM SIGIR Forum, vol. 51. ACM New York, NY, USA, 243-250.

Michael A Stephens. 1974. EDF statistics for goodness of fit and some comparisons. Journal of the American statistical Association 69, 347 (1974), 730-737.

Miroslav Dudík, Dumitru Erhan, John Langford, and Lihong Li. 2014. Doubly robust policy evaluation and optimization. Statist. Sci. 29, 4 (2014), 485-511.

Miroslav Dudík, John Langford, and Lihong Li. 2011. Doubly robust policy evaluation and learning. arXiv preprint arXiv: 1103.4601 (2011).

Nathan Kallus and Masatoshi Uehara. 2019. Intrinsically efficient, stable, and bounded off-policy evaluation for reinforcement learning. Advances in neural information processing systems 32 (2019).

Nicolo Cesa-Bianchi and Gábor Lugosi. 2012. Combinatorial bandits. J. Comput. System Sci. 78, 5 (2012), 1404-1422.

Nikos Vlassis, Ashok Chandrashekar, Fernando Amat, and Nathan Kallus. 2021. Control variates for slate off-policy evaluation. Advances in Neural Information Processing Systems 34 (2021).

Philip S Thomas. 2015. Safe reinforcement learning. (2015).

Philip Thomas, Georgios Theocharous, and Mohammad Ghavamzadeh. 2015. High-confidence off-policy evaluation. In Proceedings of the AAAI Conference on Artificial Intelligence, vol. 29.

Pranab K Sen and Julio M Singer. 1994. Large sample methods in statistics: an introduction with applications. vol. 25. CRC press.

R Tyrrell Rockafellar, Stanislav Uryasev, et al. 2000. Optimization of conditional value-at-risk. Journal of risk 2 (2000), 21-42.

Ramtin Keramati, Christoph Dann, Alex Tamkin, and Emma Brunskill. 2020. Being optimistic to be conservative: Quickly learning a cvar policy. In Proceedings of the AAAI conference on artificial intelligence, vol. 34. 4436-4443.

Richard S Sutton and Andrew G Barto. 2018. Reinforcement learning: An introduction. MIT press.

Ron Kohavi and Roger Longbotham. 2017. Online Controlled Experiments and A/B Testing. Encyclopedia of machine learning and data mining 7, 8 (2017), 922-929.

Shuai Li, Yasin Abbasi-Yadkori, Branislav Kveton, Shan Muthukrishnan, Vishwa Vinay, and Zheng Wen. 2018. Offline evaluation of ranking policies with click models. In Proceedings of the 24th ACM SIGKDD International Conference on Knowledge Discovery & Data Mining. 1685-1694.

Yash Chandak, Georgios Theocharous, James Kostas, Scott Jordan, and Philip Thomas. 2019. Learning action representations for reinforcement learning. In International conference on machine learning. PMLR, 941-950.

Yash Chandak, Scott Niekum, Bruno da Silva, Erik Learned-Miller, Emma Brunskill, and Philip S Thomas. 2021. Universal off-policy evaluation. Advances in Neural Information Processing Systems 34 (2021).

Yu-Xiang Wang, Alekh Agarwal, and Miroslav Dudik. 2017. Optimal and adaptive off-policy evaluation in contextual bandits. In International Conference on Machine Learning. PMLR, 3589-3597.

Yuta Saito, Aihara Shunsuke, Matsutani Megumi, and Narita Yusuke. 2020. Open Bandit Dataset and Pipeline: Towards Realistic and Reproducible Off-Policy Evaluation. arXiv preprint arXiv:2008.07146 (2020).

| Sample Size | 0.5x10⁶ | 1x10⁶ | 5x10⁶ | 10x10⁶ |
|---|---|---|---|---|
| SUnO | 0.253 | 0.257 | 0.257 | 0.269 |
| UnO | 0.543 | 0.543 | 0.541 | 0.567 |

Fig. 7E

UTILIZING ADDITIVE DECOMPOSITION FOR UNIVERSAL OFF-POLICY EVALUATION OF DIGITAL CONTENT SLATE RECOMMENDATIONS

BACKGROUND

Recent years have seen significant improvements in hardware and software platforms for generating and transmitting digital content for computing devices across computer networks. For example, conventional systems can utilize a variety of intelligent models to generate and provide digital content recommendations to client devices, such as content recommendations within dedicated client applications or websites. To illustrate, conventional systems can utilize computer-implemented recommender models to select digital content for a particular frame within a website based on historical context information extracted regarding a particular client device.

Although conventional systems generate digital content recommendations, such systems suffer from a number of technical shortcomings. For example, conventional systems are often inefficient. Indeed, conventional systems often require extensive computing resources to monitor and test recommendation models and policies with various client devices. To illustrate, in generating a digital recommendation policy for selecting digital content, conventional systems often perform A/B testing (or other testing approaches) to determine a predicted distribution of target values. Such testing, however, requires significant time and computing resources in transmitting digital content, monitoring digital interactions with client devices, and evaluating results using one or more models. Thus, for each new digital recommendation policy, conventional systems expend significant computing resources to determine an estimated distribution of policy performance metrics with computing devices across computer networks. This is especially true for slate recommendation applications involving a digital content slate having multiple digital content slots (i.e., slots for selecting and surfacing multiple digital content items). Indeed, in such applications, the number of possible permutations grows exponentially large with each digital slot, requiring additional testing/training samples to train and evaluate pertinent recommendation models.

As suggested above, without such extensive testing measures, conventional systems are technically inaccurate. Indeed, conventional systems often fail to generate an accurate estimation of performance for new recommendation policies. Accordingly, conventional systems often select digital recommendation policies that provide irrelevant digital content to client devices. This inaccuracy leads to additional inefficiencies in unnecessarily transmitting digital content that fails to align with the pertinent features, characteristics, or needs of receiving client devices.

Conventional systems also suffer from operational inflexibility. Indeed, because conventional systems require such extensive testing (particularly in the multi-slot, slate environment), conventional systems cannot flexibly adapt or quickly deploy new models. Accordingly, conventional systems are often rigidly tied to previously tested digital recommendation policies until performing time-consuming, additional performance analyses. Thus, conventional systems lack the flexibility to transition across different digital recommendation policies (through offline environmental analysis) without significantly sacrificing the accuracy of implementing computing devices due to a lack of information regarding the distribution of target values for a new recommendation policy. In addition, conventional systems are also limited to predictions regarding a particular estimated reward value for implementing a policy. For intelligent distribution of digital content, implementing computing devices often need more robust, flexible performance estimators that allow for in depth statistical analysis of potential policies.

The along with additional problems and issues exist with regard to conventional content recommendation services.

BRIEF SUMMARY

Embodiments of the present disclosure provide benefits and/or solve one or more of the foregoing or other problems in the art with systems, non-transitory computer-readable media, and methods for utilizing slot-level density ratio summations for universal off-policy evaluation of digital content slate recommendations in computer-implemented contextual bandit models. In particular, in one or more embodiments, the disclosed systems analyze historical slate data reflecting monitored slate interactions across a variety of computing devices for a first slate recommendation policy and generate off-policy estimations of a target reward distribution for one or more target slate recommendation policies. To illustrate, the disclosed systems generate target reward distributions within a slate setting, utilizing an additive decomposition which allows for off-policy estimation in structured high dimensional action spaces. Specifically, in one or more implementations, the disclosed systems perform a summation over slot-level density ratios between slate recommendation policies to generate a predicted reward distribution for a target slate recommendation policy. This additive decomposition allows disclosed systems to analyze slates with a plurality of individual content slots to be surfaced to client devices. Thus, in one or more embodiments, the disclosed systems flexibly and efficiently transform historical interactions across computer networks under a historical slate recommendation policy into an accurate performance distribution of target values for a new slate recommendation policy (without requiring additional online testing or evaluation).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

FIGS. 7A-7E illustrate tables of experimental results demonstrating accuracy and efficiency improvements in accordance with one or more embodiments.

DETAILED DESCRIPTION

Figure 1:
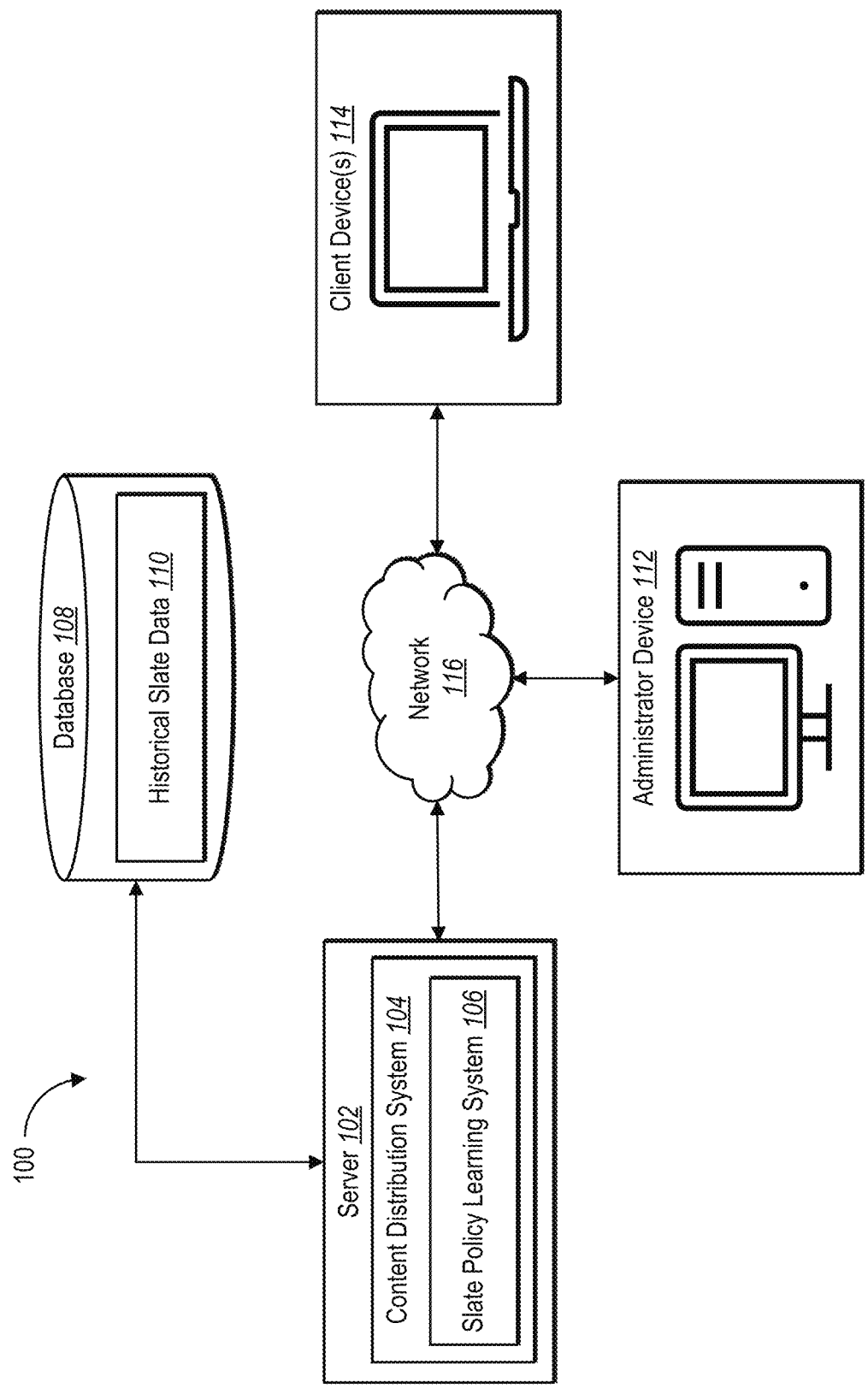
FIG. 1 illustrates an environment in which a slate policy learning system can operate in accordance with one or more embodiments of the present disclosure.

Embodiments of the present disclosure provide benefits and/or solve one or more of the foregoing or other problems in the art with systems, non-transitory computer-readable media, and methods for utilizing slot-level density ratio summations for universal off-policy evaluation of digital content slate recommendations in computer-implemented contextual bandit models. In particular, in one or more embodiments, the slate policy learning system utilizes an unbiased and consistent estimator for the complete distribution of a target value for universal off-policy evaluation of high-dimensional slate problems in the contextual bandit setting. Specifically, in one or more implementations, the slate policy learning system performs additive decomposition through a summation of slot-level density ratios between slate recommendation policies to generate a predicted reward distribution for a target slate recommendation policy. Utilizing this approach, in one or more implementations the slate policy learning system flexibly and efficiently transforms historical interactions under a historical slate recommendation policy into an accurate performance distribution of target values for a new slate recommendation policy.

As mentioned, in one or more implementations, the slate policy learning system monitors, generates, receives, and/or accesses historical data indicating interactions with a slate under a previous slate recommendation policy. In particular, in one or more embodiments, the slate policy learning system implements the previous slate recommendation policy by selecting digital content (i.e., performing slate actions) according to contextual data to populate slots of a slate. In one or more embodiments, the slate policy learning system then monitors client device interactions with the digital content of the slate to determine observed rewards. Further, in some implementations, the slate policy learning system stores the slate actions, contextual data (e.g., contextual data embeddings), and observed rewards in a database of historical slate data and receives or accesses this historical slate data in performing offline evaluation of other target slate policies.

In some embodiments, the slate policy learning system utilizes this historical slate data to determine a performance distribution of another (e.g., new) slate recommendation policy. In particular, the slate policy learning system determines the conditional distribution function of a slate reward by additively decomposing over slots as the sum of slot-level latent functions. For example, the slate policy learning system generates slot-level density ratios comparing the two slate recommendation policies and combines the slot-level density ratios additively.

To illustrate, the slate policy learning system utilizes the client device context from the historical slate data to determine the probability of recommending a plurality of slot-level actions for the slate utilizing the target slate recommendation policy. In some embodiments, the slate policy learning system generates a slot-level density ratio for each slot-level action by comparing the probability of the second slate recommender policy recommending a slot-level action and the historical data of the first slate recommender policy recommending the slot-level action from the historical slate data.

Additionally, in one or more embodiments, the slate policy learning system generates slot-level density ratios for a plurality of slots in a given slate and across a plurality of slates. For example, the slate policy learning system generates a plurality of slot-level density ratios corresponding to a plurality of slots populating each individual slate. Additionally, in one or more embodiments, the slate policy learning system generates slot-level density ratios for a plurality of different slates with each of their own plurality of slots.

In some embodiments, the slate policy learning system sums the plurality of slot-density ratios generated for a given slate. For example, the slate policy learning system generates an importance weight for each slate action by adding the plurality of slot-density ratios corresponding to the plurality of slots of the slate. In this manner, the slate policy learning system determines importance weights for each slate action across a plurality of slates.

In one or more implementations, the slate policy learning system applies the importance weights to historical slate data to generate a performance distribution. For example, the slate policy learning system iteratively analyzes target values by applying the plurality of importance weights to observed rewards from the historical slate data. By iteratively applying the plurality of weights to observed rewards for particular target values, in one or more implementations the slate policy learning system build a probability distribution, such as a cumulative distribution function or probability density function. Moreover, in one or more implementations, the slate policy learning system utilizes the probability distribution to perform comprehensive off-policy analysis, such as generating risk metrics according to the probability distribution for selecting a slate recommendation to deploy for selection and distribution of additional digital content across computer networks.

The slate policy learning system provides several technical benefits relative to conventional systems. For instance, in contrast to the extensive testing and computer resources required by conventional systems, in one or more implementations, the slate policy learning system, evaluates historical slate data available from previous slate recommendation policies to generate performance distributions of other target slate recommendation policies. In particular, by performing additive decomposition to determine importance weights for a target recommendation policy, in one or more implementations the slate policy learning system efficiently transforms historical slate data into a robust distribution reflecting anticipated performance of a new slate recommendation policy. Thus, in some embodiments, the slate policy learning system avoids significant time and computing resources utilized by conventional systems to evaluate and test new slate recommendation policies.

Additionally, the slate policy learning system also improves accuracy relative to conventional systems with more efficient utilization of samples. Indeed, in one or more implementations, the slate policy learning system significantly improves performance in generating predicted performance distributions. For instance, the slate policy learning system estimates conditional distribution functions and tail measures more accurately. Indeed, as demonstrated by empirical analysis summarized below (e.g., in relation to FIGS. 7A-7E), the slate policy learning system shows significant variance reduction and improved sample efficiency over prior approaches. Moreover, the slate policy learning system more accurately selects and deploys slate recommendation policies, therefore reducing wasted computer resources in distributing irrelevant or unnecessary digital content to client devices.

Furthermore, the slate policy learning system also improves operational flexibility relative to conventional systems. Indeed, by utilizing the additive decomposition approaches disclosed herein, in one or more implementations the slate policy generates offline universal performance distributions for new slate recommendation policies. This allows the slate policy learning system to flexibly adapt and deploy new slate recommendation policies. Indeed, without performing any additional testing, in one or more implementations the slate policy learning system generates a robust cumulative distribution function for a new slate recommendation policy, generates and analyzes risk metrics, and deploys the slate recommendation policy without any unnecessary delay for rigid testing of the new slate recommendation policy. Thus, in some embodiments the slate policy learning system flexibly transitions across different slate recommendation policies without sacrificing accuracy or expending significant computer resources.

As illustrated by the foregoing discussion, the present disclosure utilizes a variety of terms to describe features and advantages of the disclosed method. Additional detail is now provided regarding the meaning of such terms. As used herein, the term "historical slate data" refers to data or digital information reflecting previous performance of one or more slate recommendation policies. In particular, historical slate data includes a repository of digital data indicating observed rewards from populating slots of digital slates utilizing a slate recommendation policy. Thus, in one or more implementations historical slate data includes details of the slate recommendation policy, client device context (e.g., client device context embeddings) that informed selection of the digital content, slate actions (e.g., digital content selected for the whole slate), slot actions (e.g., digital content selected for each slate), and/or observed rewards.

Additionally, as used herein, the term "observed reward" refers to outcomes or results of slate recommendation policies. In particular, observed rewards include the outcome of logged actions taken by online devices upon being presented with digital content in a slate recommended by a first slate recommendation policy. For example, observed rewards include client device interactions with digital content (e.g., clicks or views).

As used herein, the term "slate action" refers to a selection or action taken by a slate recommendation policy. In particular, a slate action refers to selecting digital content items to populate slates by a slate recommendation policy. Thus, in one or more embodiments a slate action comprises a plurality of slot-level actions (e.g., selecting digital content for slots of a slate) that additively comprise a total action taken by a slate recommendation policy.

As used herein, the term "digital slot" refers to a digital field, element, or item (e.g., that can be populated with digital content for presentation to a client device). In particular, a digital slot refers to a digital field (of a plurality of fields in a slate) that can be populated with digital content, such as digital videos, digital images, or digital text. For example, a digital slot includes a video element, an image element, or a text element that can be populated within a website.

As used herein, the term "digital slate" refers to a collection or group of digital slots. In particular, a digital slate includes a digital file, document, or item that itself includes a plurality of digital slots (e.g., that can be populated with digital content). For example, a digital slate includes a website, email, or digital document distributed to client devices that includes a plurality of fields to populate with digital content.

As used herein, the term "slate recommendation policy" refers to a digital policy designed to choose, select, or recommend actions. In particular, a slate recommendation policy includes a computer-implemented set of rules or policies for recommending digital content for digital slots in a digital slate. Thus, a slate recommendation policy includes a set of digital guides, rules, or parameters for selecting digital content for digital slots in response to a set of contextual inputs.

As used herein, the term "importance weight" refers to a value or metric indicating the relative significance, importance, or influence of a datapoint. In particular, an importance weight includes a measure of influence or significance of a historical data point from a first slate recommendation policy in predicting the performance of a second slate recommendation policy. For example, an importance weight corresponds to a sum of slot-density ratios determined by the probabilistic values of the likelihood of selecting an action at each slot. In one or more implementations, the importance weight translates between the observed reward of a first recommendation policy and a predicted reward of a second recommendation policy.

As used herein, the term "slot-level density ratio" refers to a ratio comparing slot actions taken by multiple slate recommendation policies. In particular, a slot-level density ratio includes a comparison of the probability of choosing a slot action (for a first slate recommendation policy) with the probability of choosing the slot action (for a second slate recommendation policy). For example, a slot-level density ratio includes a value obtained by dividing the probability of selecting a discrete action with regard to a discrete digital slot utilizing a first slate recommendation policy by the probability of selecting the discrete slot action with regard to the discrete digital slot utilizing a second slate recommendation policy.

As used herein, the term "predicted reward distribution" refers to a statistical distribution regarding performance of a slate recommendation policy. In particular, a predicted reward distribution refers to a probabilistic determination of the efficacy of a given slate recommendation policy across potential outcomes. Thus, for example, a predicted reward distribution includes a cumulative distribution function (a distribution reflecting the likelihood that the actual outcome will be equal to or less than a particular value) and a probability density function (a distribution reflecting the likelihood that an outcome will be equal to a particular value).

As used herein, the term "slot level action" refers to a selection or action of a slate recommendation policy in response a digital slot (of a digital slate). In particular, a slot level action comprises a selection or recommendation of digital content for a digital slot of a digital slate by a slate recommendation policy.

As used herein, the term "slot-level probability" refers to the probability of a given slot action. In particular, a slot-level probability is an indication of a likelihood that a slot recommendation policy will select a particular digital content item for a digital slot of a digital slot. For example, a slot-level probability indicates that a first slot recommendation policy has a 50% chance of performing a particular action for a digital slot, given a particular context (e.g., given a client device context).

As used herein, the term "client device context" refers to a numerical representation of contextual features (e.g., utilized by a slate recommendation policy to perform a slate action). In particular, a client device context includes a numerical embedding that reflects features of a client device accessing or interacting with a digital slate. A client device context includes one-hot encoding or another numerical representation of a variety of client device features (or features of a user corresponding to the client device), such as interests, demographic information, recent client device activity, etc.

Additional detail regarding the trajectory attribution system will now be provided with reference to the figures. For example, FIG. 1 illustrates a schematic diagram of an example system environment for implementing a slate policy learning system 106 in accordance with one or more embodiments. An overview of the slate policy learning system 106 is described in relation to FIG. 1. Thereafter, a more detailed description of the components and processes of the slate policy learning system 106 is provided in relation to the subsequent figures.

As shown, the system environment includes a server(s) 102, a content distribution system 104, a database 108, historical slate data 110, an administrator device 112, a client device(s) 114, and a network 116. Each of the components of the environment communicate via the network 116, and the network 116 is any suitable network over which computing devices communicate.

As mentioned, the system environment includes a client device 114. The client device 114 is one of a variety of computing devices, including a smartphone, a tablet, a smart television, a desktop computer, a laptop computer, a virtual reality device, an augmented reality device, or another computing device. The client device 114 communicates with the server(s) 102, the database 108, and/or the administrator device 112 via the network 116. For example, the client device 114 provides information to the server(s) 102 indicating client device interactions and/or engagement with digital content items presented as part of a digital slate. Moreover, in one or more implementations, the client device 114 displays digital content selected by a slate recommendation policy (e.g., a website having video, audio, images, and/or text selected for slots of a digital slate by a slate recommendation policy).

As illustrated in FIG. 1, the system environment includes the administrator device 112. In some cases, the administrator device 112 manages, distributes, and/or supervises digital content associated with one or more environments. For example, in some cases, the administrator device 112 selects a particular slate recommendation policy to implement in providing digital content to client devices. Similarly, in some implementations, the administrator device 112 includes a repository of digital content that the slate recommendation policy selects from in populating a digital slate.

As illustrated in FIG. 1, the system environment includes the server(s) 102. The server(s) 102 generates, tracks, stores, processes, receives, and transmits electronic data. For example, the server(s) 102 receives data from the client device 114 in the form of interactions with digital slates. In some embodiments, the server(s) 102 communicates with the client device 114, the database 108, and/or administrator device 112 to transmit and/or receive data via the network 116, including client device interactions. In one or more embodiments, the server(s) 102 provides digital content to client devices (by populating digital slots of digital slates utilizing a slate recommendation policy. Moreover, the server(s) 102 analyze new slate recommendation policies based on historical data and generate performance distributions for the new slate recommendation policies. The server(s) 102 also provide performance distributions for display (e.g., to the administrator device 112 for selection of what slate recommendation policies to deploy). In some embodiments, the server(s) 102 comprises a distributed server where the server(s) 102 includes a number of server devices distributed across the network 116 and located in different physical locations. The server(s) 102 comprise a content server, an application server, a communication server, a web-hosting server, a multidimensional server, a container orchestration server, or a machine learning server.

The server(s) 102 further access and utilize a database 108 to store and retrieve information such as historical data, digital content, and/or different slate recommendation policies. Indeed, as illustrated in FIG. 1, the database 108 stores digital content and/or historical slate data 110 related to various client device interactions. In particular, the database contains historical slate data 110 reflecting slate actions from slate recommendation policies in light client device context and corresponding rewards (e.g., user interactions with slates).

As further shown in FIG. 1, the server(s) 102 also includes the slate policy learning system 106 as part of a content distribution system 104. For example, in one or more implementations, the content distribution system 104 is able to track, store, manage, supervise, provide, distribute, and/or share digital content, in particular in the form of digital slates. In one or more embodiments, the server(s) 102 includes all, or a portion of, the slate policy learning system 106. For example, the slate policy learning system 106 operates on the server(s) 102 to analyze slate recommendation policies in light of historical slate data and generate performance distributions for the new slate recommendation policies.

In certain cases, the client device 114 includes all or part of the slate policy learning system 106. For example, the client device 114 generates, obtains (e.g., downloads), or utilizes one or more aspects of the slate policy learning system 106 from the server(s) 102. Indeed, in some implementations, as illustrated in FIG. 1, the slate policy learning system 106 is located in whole or in part on the client device 114. For example, the slate policy learning system 106 includes a web hosting application that allows the client device 114 to interact with the server(s) 102. To illustrate, in one or more implementations, the client device 114 interacts with digital slates recommended and/or surfaced by the server(s) 102.

In one or more embodiments, the client device 114 and the server(s) 102 work together to implement the slate policy learning system 106. For example, in some embodiments, the server(s) 102 train one or more slate recommender policies discussed herein and provide the one or more slate recommender policies to the client device 114 for implementation. In some embodiments, the server(s) 102 trains one or more machine slate recommender policies together with the client device 114.

Although FIG. 1 illustrates a particular arrangement of the system environment, in some embodiments, the system environment has a different arrangement of components and/or may have a different number or set of components altogether. For instance, as mentioned, the slate policy learning system 106 is implemented by (e.g., located entirely or in part on) the client device 114 or the administrator device 112. In addition, in one or more embodiments, the client device 114 communicates directly with the slate policy learning system 106, bypassing the network 116. Further, in some embodiments, the database 108 is maintained and/or housed by the server(s) 102, the administrator device 112, or a third-party device.

As mentioned above, in one or more embodiments, the slate policy learning system 106 evaluates slate recommendation policies by generating predicted reward distributions from historical slate data. For example, FIG. 2 illustrates the slate policy learning system 106 generating a predicted reward distribution of a slate recommendation policy based on historical slate data from a previous slate recommendation policy.

Figure 2:
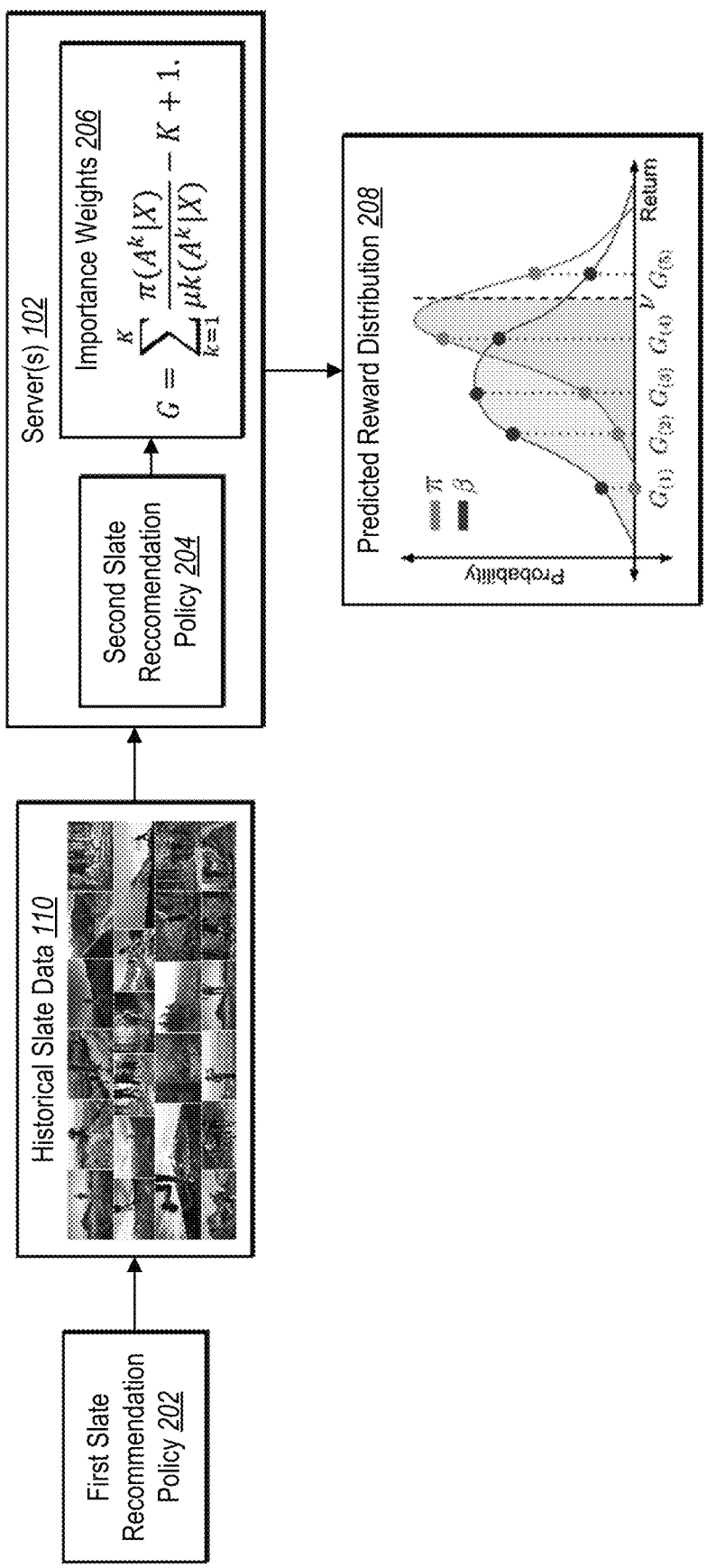
FIG. 2 illustrates an overview diagram of evaluating a slate recommendation policy and generating a predicted reward distribution in accordance with one or more embodiments of the present disclosure.

Specifically, FIG. 2 illustrates a first slate recommendation policy 202. In particular, the first slate recommendation policy 202 includes a policy previously deployed in an online environment (e.g., for selecting digital content for client devices). For example, the first slate recommendation policy 202 includes an algorithm or digital rule set for recommending digital content for digital slates to client devices. Further, the first slate recommendation policy 202 populates digital slots of digital slates utilizing digital videos, images, etc. based on client device context.

As further shown in FIG. 2, the slate policy learning system 106 generates, monitors, or accesses historical slate data 110 in connection with the first slate recommendation policy 202. For example, the first slate recommendation policy 202 analyzes client device context to surface, recommend, or select digital content for a digital slate. The slate policy learning system 106 provides the digital slate (with populated digital content items) to client devices. The slate policy learning system 106 monitors and records these user interactions as observed rewards within the historical slate data 110. The slate policy learning system 106 also records the context leading to the slate action of the first slate recommendation policy and corresponding reward. Additional information regarding generating and accessing historical slate data 110 is provided below (e.g., in relation to FIGS. 3 and 4).

As shown in FIG. 2, the slate policy learning system 106 utilizes the historical slate data 110 to evaluate subsequent slate recommendation policies. For example, the second slate recommendation policy 204 includes an algorithm or rule set with different parameters or criteria than the first slate recommendation policy 202. As shown, the slate policy learning system 106 can determine the predicted reward distribution 208 for the second slate recommendation policy 204 (even without having any historical slate data for the second slate recommendation policy 204).

In particular, as illustrated in FIG. 2 the slate policy learning system 106 analyzes the historical slate data 110 of the first slate recommendation policy and generates importance weights 206. In particular, the slate policy learning system 106 analyzes slate actions of the first slate recommendation policy 202 and a probability of performing the same slate actions (in light of the same client device context) utilizing the second slate recommendation policy 204. The slate policy learning system 106 generates slate-level density ratios by comparing the probabilities of performing slate actions across these two slate recommendation policies. Furthermore, the slate policy learning system 106 sums the slate-level density ratios for each slate to generate an importance weight (for a particular slate). The slate policy learning system 106 iteratively sums slate-level density ratios to generate a plurality of importance weights for each slate. These importance weights 206 thus represent the relative importance or influence of any particular datapoint from the historical slate data 110 of the first slate recommendation policy 202 in determining an anticipated reward under the second slate recommendation policy 202. Additional information on the generation of importance weights 206 is provided below (e.g., in relation to FIG. 5).

Upon determining the importance weights 206, the slate policy learning system 106 applies the importance weights 206 to the historical slate data 110 to generate the predicted reward distribution 208. The predicted reward distribution 208 demonstrates probabilities of different outcomes (e.g., overall reward values) anticipated upon applying the second slate recommendation policy 204. The slate policy learning system 106 generates the predicted reward distribution 208 by applying the importance weights 206 to the observed rewards from the historical slate data 110 of the first slate recommendation policy 202. In this manner, the slate policy learning system 106 generates the predicted reward distribution 208, such as cumulative distribution function or a probability density function for the second slate recommendation policy 204. Thus, as shown, the slate policy learning system 106 applies the importance weights 206 to transform an initial reward distribution for the first slate recommendation policy 202 into a predicted reward distribution for the second slate recommendation policy 202. Additional information regarding generating a predicted reward distribution utilizing importance weights is provided below (e.g., in the description of FIG. 6).

Figure 3:
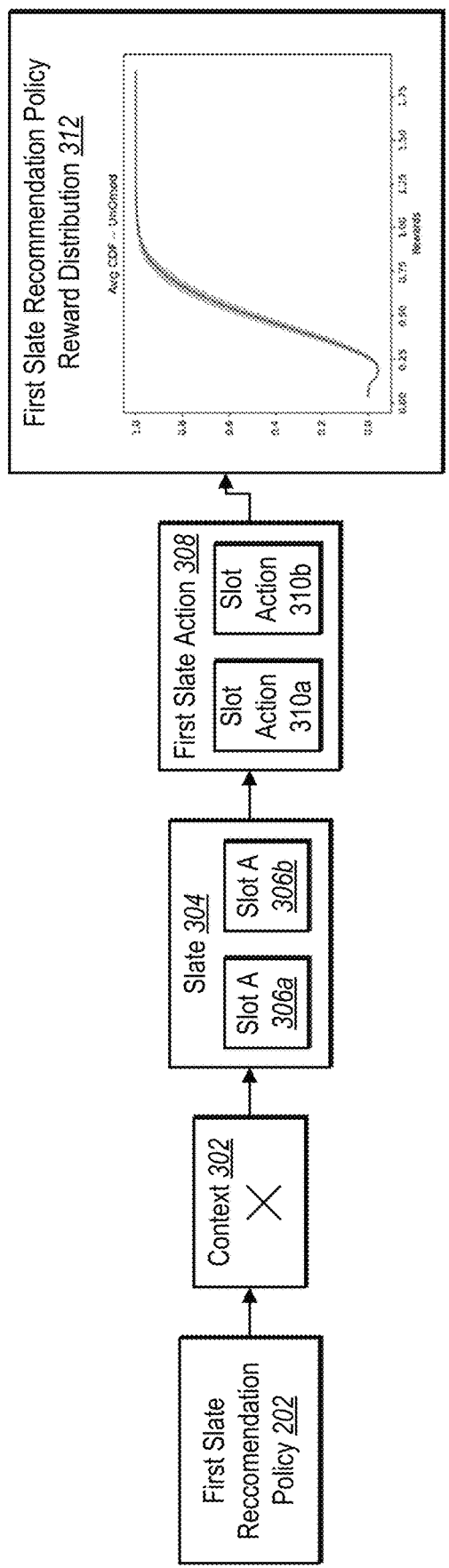
FIG. 3 illustrates generating historical slate data for a historical slate recommendation policy in accordance with one or more embodiments.

As discussed above, in one or more implementations, the slate policy learning system 106 generates historical slate data by monitoring slate actions and slot-level rewards across a variety of computing devices for a slate recommendation policy. FIG. 3 shows the slate policy learning system 106 generating historical slate data for an initial slate recommendation policy in accordance with one or more embodiments.

As shown in FIG. 3, the slate policy learning system 106 applies a first slate recommendation policy 202 and monitors client device interactions with resulting digital content to generate a body of historical slate data. More specifically, the slate policy learning system 106 identifies or extracts a context 302. The context 302 represents client device context analyzed in selecting a particular digital content item to surface to a client device. In particular, the slate policy learning system 106 utilizes the context 302 to inform the first slate recommendation policy 202. For example, the slate policy learning system 106 analyzes the context 202 utilizing the first slate recommendation policy 202 to select digital content for a slate 304. As discussed previously, a slate contains a plurality of slots, as represented by a slot 306a and a slot 306b of the slate 304.

As illustrated, the slate policy learning system 106 applies the first slate recommendation policy 202, conditioned by the context 302, to generate a first slate action 308 for the slate 304 (e.g., selecting digital content for the slate). This first slate action 308 contains a plurality of slot-level actions (e.g., selecting individual digital content items for each slate), as shown by a slot action 310a and a slot action 310b. The slate policy learning system 106 applies the first slate recommendation policy 202 to generate the slot actions 310a and 310b by populating the slots 306a and 306b with digital content (e.g., digital videos, digital images, digital text).

Although not illustrated, in one or more implementations, the slate policy learning system 106 also determines and records a probability of particular slot actions and/or slate actions. For example, the slate policy learning system 106 records slot-level action probabilities or slate-level action probabilities for corresponding actions. For instance, the first slate recommendation policy 202 can include conditional rules or probabilistic sampling approaches. In one or more implementations, the slate policy learning system 106 not only record the particular slate action or slot-level action selected by the first slate recommendation policy 202, but also monitors and records the probability of selecting those actions utilizing the first slate recommendation policy 202.

As indicated above, the slate policy learning system 106 logs (e.g., monitors and stores) one or more observed rewards based on the first slate action 308. For example, the slate policy learning system 106 monitors client device interactions with the slots 306a, 306b of the slate 304. To illustrate, the slate policy learning system 106 provides digital content to the client devices via the slots 306a, 306b of the slate 304 and detects different client device interactions, such as time viewing the digital content, clicks with regard to the digital content, etc.

As shown, the slate policy learning system 106 also determines a first slate reward distribution 312. The first slate reward distribution 312 represents a statistical expression of reward probabilities for implementing the first slate recommendation policy. In one or more embodiments, the slate policy learning system 106 represents the first slate reward distribution 312 as a cumulative distribution function or a probability density function.

Although FIG. 3 illustrates the slots 306a, 306b, the slate policy learning system 106 can utilize slates having a different number of slots (e.g., 3, 4, 5, or 10 slots). Moreover, although FIG. 3 only illustrates a single slate, the slate policy learning system 106 can iteratively populate a plurality of slates and monitor client device interactions to generate a robust log of historical slate data. Similarly, although FIG. 3 illustrates the slate policy learning system 106 generating the first slate reward distribution 312, the slate policy learning system 106 need not generate the first slate reward distribution 312 to determine additional reward distributions for other slate recommendation policies.

As described above, in one or more implementations the slate policy learning system 106 formulates the slate recommendation problem as a contextual bandit with a combinatorial action space. The slate policy learning system 106 formulates each slate action to have K slots (dimensions of the action vector). The slate policy learning system 106 interacts with the contextual bandit to result in a random tuple (X, A, R) at each step, where X~dX (·) is the user context, A is the slate action generated by the recommendation strategy where $A=[A^k]_{k=1}^K$ is composed of K slot-level actions, and R~dR (·|A, X) is the (scalar) slate-level reward. Because the rewards are often observed at the slate level (rather than at an individual slot level), this disclosure often uses reward and slate reward interchangeably. Each slot-level action can take N candidate values, leading to a combinatorially large action space.

The slate policy learning system 106 uses a logging policy $\mu(A|X)=\Pr(A|X)$ to recommend slate actions conditioned on context X online which it uses for collecting a dataset for offline evaluation. The dataset consists of n i.i.d. samples Dn={(Xi, Ai, Ri)}n i=1, generated by the user-bandit interaction. The slate policy learning system 106 focus on the case where μ is a factored policy over the slots, that is, (e.g., Algorithm 1):

$$\mu(A|X) = \prod_{k=1}^{K} \mu_k(A^k|X).$$

The slate policy learning system 106 uses off-policy evaluation to utilize data Dn logged using a policy μ, to compute functions of the target reward under π. Conventional methods focus on the estimation of the expected reward under the target policy. In one or more embodiments, the slate policy learning system 106 focuses on the estimation of quantities that go beyond just the expected target reward.

The slate policy learning system 106 generates estimates of any quantity y which are denoted by y^n where the subscript indicates the number (n) of data points used for estimation. For instance, when the slate policy learning system 106 generates the estimate of the cumulative distribution (CDF) of R at v, FR (v) will be denoted by $\hat{F}_{R,n}(v)$. When rewards are generated by the slate policy learning system 106, it is implied that the CDF of the slate reward is being considered. In that case, this disclosure omits the subscript R and specifies the reward distribution generating policy. The slate policy learning system uses F π(·) to denote the CDF of rewards under policy π (such as the first slate reward distribution 312).

Figure 4:
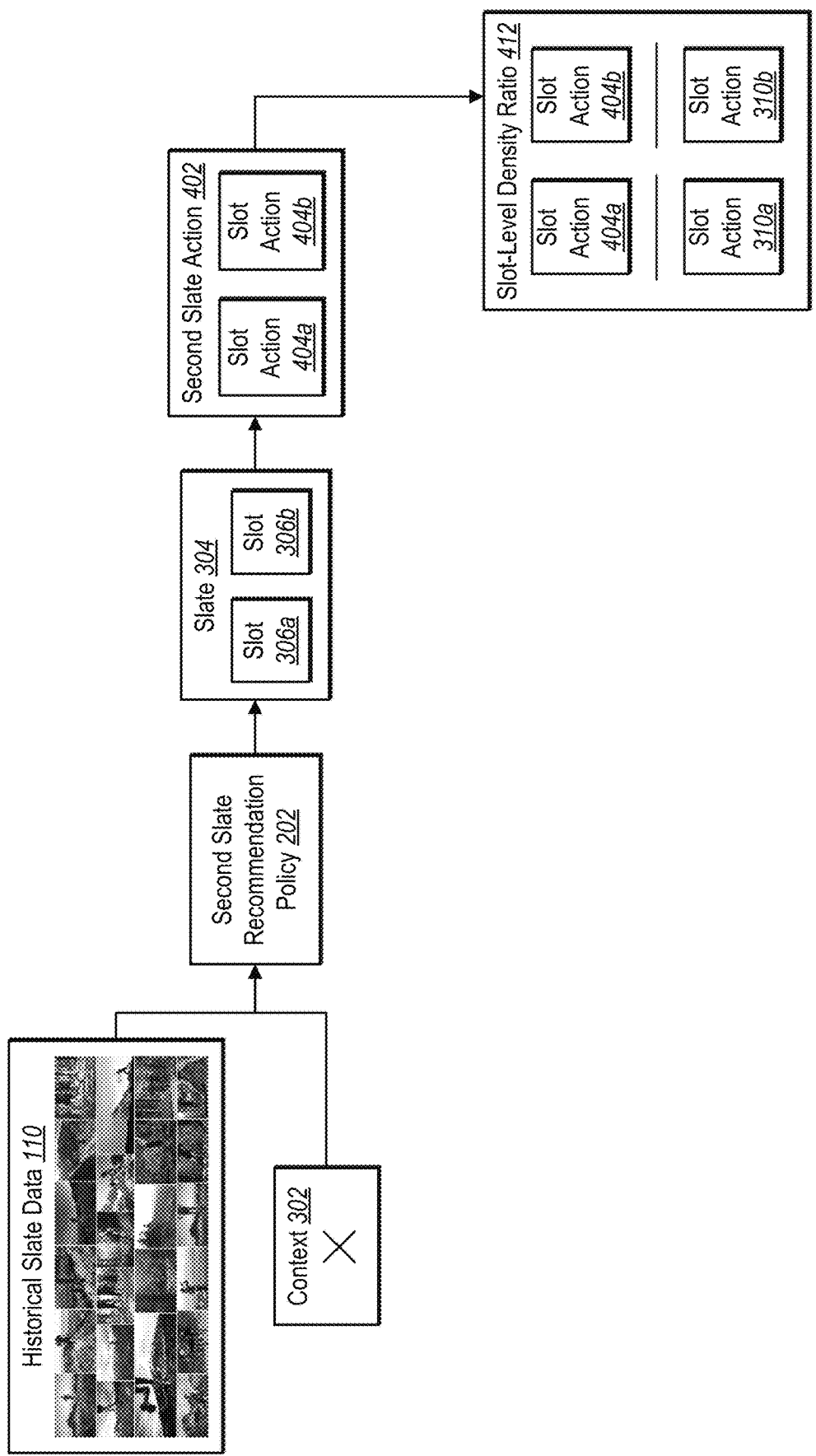
FIG. 4 illustrates generating slot-level density ratios comparing slate recommendation policies in accordance with one or more embodiments.

As discussed above, in one or more implementations, the slate policy learning system 106 generates slot-density ratios for each slot-level action. FIG. 4 shows the slate policy learning system 106 generating slot-density ratios comparing the initial slate recommender policy with a second slate recommender policy in accordance with one or more embodiments.

As shown in FIG. 4, the slate policy learning system 106 analyzes the historical slate data 110 and the context 302 utilizing the second slate recommendation policy 204. More specifically, in one or more embodiments, the slate policy learning system 106 conditions the recommendation of the second slate recommendation policy 204 on both the context 302 and the historical slate data 110 obtained from online logging.

As illustrated, the slate policy learning system 106 analyzes the historical slate data 110 and the context 302 as the slate policy learning system 106 applies the second slate recommendation policy 204 to the slate 304. In particular, the slate policy learning system 106 utilizes the second slate recommendation policy to select digital content for the slate 304. As discussed previously, a slate contains a plurality of slots, as represented by the slots 306a and 306b of the slate 304.

As shown, the slate policy learning system 106 applies the second slate recommendation policy 204, informed by the historical slate data 110 and the context 302, to generate a second slate action 402 for the slate 304 (e.g., selecting digital content for the slate). This second slate action 402 contains a plurality of slot-level actions (e.g., selecting individual digital content items for each slate), as shown by a slot action 404a and a slot action 404b. The slate policy learning system 106 applies the second slate recommendation policy 204 to generate the slot actions 404a and 404b by populating the slots 306a and 306b with digital content (e.g., digital videos, digital images, digital text).

Although not illustrated, in one or more implementations, the slate policy learning system 106 also determines and records a probability of particular slot actions and/or slate actions. As discussed above with regard to FIG. 3, the slate policy learning system 106 records slot-level probabilities or slate-level action probabilities for corresponding actions. In some implementations, the probability of a particular slot action is 1 (e.g., 100% if selected by the policy) 0 (e.g., 0 if not selected by the policy) or an intermediate value (e.g., if there is an intermediate sampling probability associated with the selection).

As illustrated, the slate policy learning system 106 then generates a set of slot-level density ratios 412 based on the second slate action 402 and the historical slate data 110. More specifically, the slate policy learning system 106 generates the slot-level density ratios 412 by dividing representations of the slot-level actions (e.g., a first set of slot-level probabilities) generated by the second slate recommendation policy 204 (the slot actions 404a and 404b) by representations of the slot-level actions (e.g., a second set of slot-level probabilities) generated by the first slate recommendation policy 202 (the slot actions 310a and 310b). In particular, the slate policy learning system 106 generates the slot-level density ratios 412 by dividing slot-level probabilities of the slot actions generated at the same slot by the two different slate recommendation policies, such as the slot action 404a (generated by the second slate recommendation policy 204) and the slot action 310a (generated by the first slate recommendation policy 202).

Although FIG. 4 illustrates the slots 306a, 306b, the slate policy learning system 106 can utilize slates having a different number of slots. Moreover, although FIG. 4 only illustrates a single slate, the slate policy learning system 106 can iteratively populate a plurality of slates and monitor client device interactions to generate a robust catalogue of slot-density ratios for each slate in a plurality of slates. Furthermore, although FIG. 4 illustrates a single slot density ratio, the slate policy learning system 106 can generate slot-density ratios for each slot in a slate. Moreover, the slate policy learning system 106 can generate slot density ratios for each slot in a first slate, each slot in a second slate, each slot in a third slate, etc.

As described above, in one or more implementations, the slate policy learning system 106 evaluates the second slate recommendation policy 204 through importance sampling as a form of an off-policy evaluation. The slate policy learning system 106 applies an importance sampling estimator relying on a weak common-support assumption, requiring support at the slot level instead of the entire slate. Therefore, the slate policy learning system 106 evaluates a set, $D_n$, which contains independent and identically distributed (i.i.d.) tuples generated using μ, such that for some (unknown)$\varepsilon>0, \mu_k(A^k|X)<\varepsilon \Rightarrow \pi(A^k|X)=0; \forall k, X, A$ Unlike most off-policy estimators, which provide estimates of the expected reward of a policy, the slate policy learning system 106 generates a whole reward distribution of a target reward under a policy (e.g., by incorporating the slot-level density ratios 412).

Figure 5:
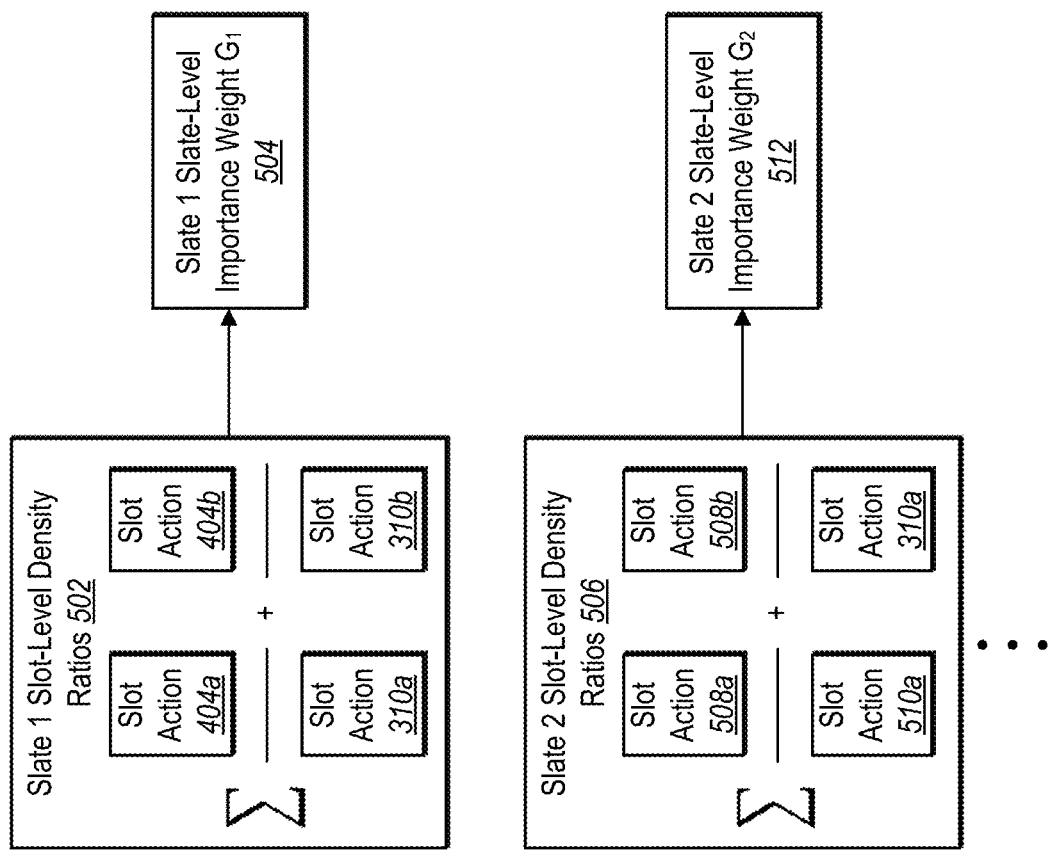
FIG. 5 illustrates generating slot-level importance weights for a plurality of slates in accordance with one or more embodiments.

As discussed above, in one or more implementations, the slate policy learning system 106 generates a plurality of importance weights for an individual slate by summing a plurality of slot-level density ratios. FIG. 5 shows the slate policy learning system 106 generating the plurality of importance weights in accordance with one or more embodiments.

As shown in FIG. 5, the slate policy learning system 106 sums slate 1 slot-level density ratios 502 for slate 304. More specifically, the slate policy learning system 106 adds the slot-level density ratios, with each ratio comprising the slot-level probability of a slot action generated by the second slate recommendation policy 204 (e.g., slots actions 404a and 404b) divided by the slot-level probability of the slot action generated by the first slate recommendation policy 202 (e.g., slot actions 310a and 310b).

As illustrated, the slate policy learning system 106 uses the sum of slot-level density ratios 502 for the slate 304 to generate a slate 1 slate-level importance weight 504 for the slate 304. This slate-level importance weight 504 represents a slate-level importance weight for the slate 304 based on the slot-level density ratios 412.

As further illustrated, in one or more embodiments, the slate policy learning system 106 generates importance weights for the slate 304 (e.g., a different instance of populating the slate 304 or a different slate). The slate policy learning system 106 sums the slate 2 slot-level density ratios 506, representing the ratio of a plurality of slot-level probabilities of slot-level actions (e.g., selecting individual digital content items for each slate) recommended by the first and second slate recommendation policies 202 and 204. More specifically, the slate policy learning system 106 sums a plurality of the ratio of each discrete slot-level probability of a slot action generated by the second slate recommendation policy 204 (e.g., the slot action 508a and the slot action 508b) compared to the discrete slot-level probability of a slot action generated by the first slate recommendation policy 202 (e.g., the slot action 510a and the slot action 510b).

As shown, the slate policy learning system 106 uses the slate 2 slot-level density ratios 506 for the second slate to generate a slate 2 slate-level importance weight 512 for the second slate. This slate-level importance weight 512 represents a slate-level importance weight for the second slate comprised of a plurality of slot-level density ratios for the slots comprising the second slate.

Although FIG. 5 illustrates the slate 1 slot-level density ratios 502 and the slate 1 slate-level importance weight 504 and the slate 2 slot-level density ratios 506 and the slate 2 slate-level importance weight 512, the slate policy learning system 106 can utilize a plurality of slates (e.g., 3, 4, 5, or 10 slates). Furthermore, although FIG. 5 uses the notation "Slate 1" and "Slate 2" it will be appreciated that this notation includes performing different slate actions on the same digital slate (e.g., the same website with the same slots). Thus, "Slate 1" can include a first slate action for a slate and "Slate 2" can include a second slate action for the same slate. Accordingly, the slot action 404a (and corresponding slot-level probability) can include a first slot-level action for a first slot corresponding to a first slate-level action of the slate. Similarly, the slot action 508a (and corresponding slot-level probability) can include a second slot-level action for the slot corresponding to a second slate-level action for the slate.

Moreover, in such an implementation, FIG. 5 illustrates a first slot-level density ratio (e.g., comparing the slate action 404a and the slate action 310a) for a first slot of the slate (under a first slate action), a second slot-level density ratio (e.g., comparing the slate action 404b and the slate action 310b) for a second slot of the slate (under the first slate action), a third slot-level density ratio (e.g., comparing the slate action 508*a* and the slate action 510*a*) for the first slot of the slate (under a second slate action) and a fourth slot-level density ratio (e.g., comparing the slate action 805*b* and the slate action 310*a*) for the second slate of the slate (under the second slate action).

Thus, as shown in FIG. 5, the slate policy learning system can sum, for a first slate action, a first plurality of slot-level density ratios for a plurality of digital slots to generate a first importance weight and sum for a second slate action, a second plurality of slot-level density ratios for the plurality of digital slots to generate a second importance weight.

Similarly, although FIG. 5 illustrates the slate policy learning system 106 generating importance weights utilizing the first slate recommendation policy 202 and the second slate recommendation policy 204, the slate policy learning system 106 may use additional slate recommendation policies besides the first slate recommendation policy 202 and the second slate recommendation policy 204.

A structural assumption to improve estimator efficacy in the slate setting is the additivity of expected reward. This assumption posits that the conditional mean slate-level reward decomposes additively as the sum of (arbitrary) slot-level latent functions, i.e., $\mathbb{E}[R|A, X] = \sum_{k=1}^{K} \phi_k(A_k, X)$.

Analogous to this structural assumption, the slate policy learning system 106 uses a condition on the conditional cumulative density function (CDF) of the slate reward, which allows the slate policy learning system 106 to perform consistent and unbiased estimation of the target off-policy distribution. This condition is expressed in the following assumption:

Assumption 1 (Additive CDF). The conditional CDF of the slate reward $F_R(v) := \Pr(R \leq v | A, X)$ decomposes additively over slots as the sum of (arbitrary) slot-level latent functions:

$$F_R(v) = \sum_{k=1}^{K} \psi_k(A_k, X, v), \forall_v.$$

For example, the slate policy learning system can utilize the slate-level reward to encode the time spent by a user on a webpage, whereas the slot-level functions can capture the (unobserved) time spent on each subsection of the page (note that the same additive decomposition would directly extend to the probability density function of the slate reward).

The slate policy learning system 106 uses off-policy evaluation in slates as an off-policy reward distribution estimation task. In the case of slates, the slate policy learning system 106 uses the definition of the importance weight p to rely on the factorization across slots. In conventional systems, the most direct approach for defining p in the case of a factored logging policy y is to consider a formulation analogous to importance sampling by taking the product of the slot-level probabilities but unfortunately, this approach is plagued by high variance when K is large. To remedy this, the slate policy learning system 106 utilizes the structure in slates and assumes that the CDF of the slate level reward admits an additive decomposition (Assumption 1). In place of ρ, the slate policy learning system 106 defines an importance weight G that is a sum of slot-density ratios.

$$\rho = \frac{\pi(A|X)}{\mu(A|X)} = \prod_{k=1}^{K} \frac{\pi(A^k|X)}{\mu_k(A^k|X)}; \quad G = \sum_{k=1}^{K} \frac{\pi(A^k|X)}{\mu_k(A^k|X)} - K + 1.$$

The slate policy learning system applying this approach results in significantly lower variance in estimation and improved effective sample size (it is possible to confirm that under a factored logging policy, $\mathbb{E}[G]=1$).

Figure 6:
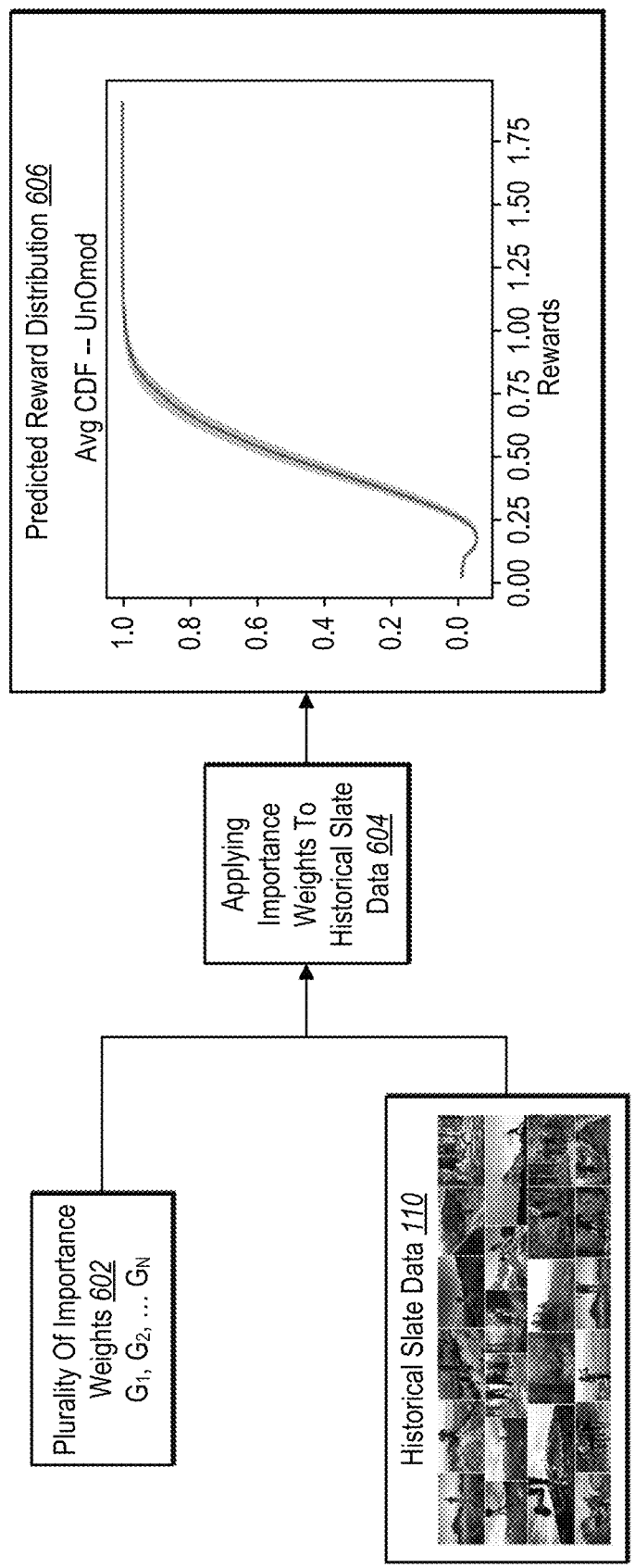
FIG. 6 illustrates applying importance weights to historical slate data to generate a predicted rewards distribution in accordance with one or more embodiments.

As discussed above, in one or more implementations, the slate policy learning system 106 generates a predicted reward distribution by applying importance weights to historical slate data. FIG. 6 shows the slate policy learning system 106 generating the predicted reward distribution from importance weights and historical slate data in accordance with one or more embodiments.

As shown in FIG. 6, the slate policy learning system 106 intakes both a plurality of importance weights 602 as well as the historical slate data. The plurality of importance weights 602 includes importance weights corresponding to a plurality of slates (e.g., the slate 1 slate-level importance weight 504 and the slate 2 slate-level importance weight 512). The slate policy learning system 106 then performs an act 604 of applying importance weights to the historical slate data.

As illustrated, the slate policy learning system 106 applies the importance weights to historical slate data to generate a predicted reward distribution 606. In particular, the slate policy learning system 106 computes individual importance weights corresponding to a digital slate. The predicted reward distribution 606 comprises a plurality of target rewards (e.g., 0.25, 0.5) and corresponding probabilities of obtaining the target reward (or lower) upon implementing the new slate recommendation policy. To generate the predicted reward distribution 606, the slate policy learning system 106 selects a target reward (e.g., 0.25). The slate policy learning system 106 selects a sample from the historical slate data 110, extracts an observed reward, and compares whether the observed reward with the target reward. If the observed reward is less than the target reward, then the slate policy learning system 106 includes (e.g., adds) the importance weight in determining the probability for the new slate recommendation policy achieving the target reward and generating the predicted reward distribution 606.

The slate policy learning system 106 can iteratively select historical samples, identify those that satisfy the target value, and apply importance weights to determine a probability of the predicted reward distribution 606 at the target value. Moreover, the slate policy learning system 106 can iteratively repeat this process for different target values to build the curve illustrated in the predicted reward distribution 606.

Although not illustrated, in one or more implementations, the slate policy learning system 106 also generates a plurality of predicted rewards distributions. For example, the slate policy learning system 106 generates a predicted rewards distributions for a plurality of slate recommendation policies (e.g., 3, 4, 5, or 10 slate recommendation policies). Moreover, although FIG. 6 only illustrates a single cumulative distribution function for the predicted reward distribution 606, the slate policy learning system 106, in one or more embodiments, generates a plurality of different predicted reward distributions (e.g., a probability density function or another distribution).

As just mentioned, in one or more implementations, the slate policy learning system 106 employs the importance weights to allow for a reformulation of the expected slate reward for the purpose of generating an estimated target CDF. The slate policy learning system 106 generates the following main result:

Theorem 1. Let R denote the real-valued random slate reward. If its conditional CDF $F_R(v)$ admits an additive K-component decomposition (Assumption 1), then under a factored y the slate policy learning system 106 has:

$$F^\pi(v) = \mathbb{E}_\mu[G \cdot 1\{R \leq v\}], \forall\, v.$$

That is, a weighted expectation of the indicator function, with weights given by G, gives the target CDF. Based on this result, the slate policy learning system 106 applies the following estimator for $F^\pi(v)$ that uses data $D_n \sim \mu$, $$\hat{F}^\pi_n(v) := \frac{1}{n}\sum_{i=1}^{n} G_i 1\{R_i \leq v\}, \forall\, v.$$

Proof For Theorem 1. Under Assumption 1 we have, $F_R(v) = \mathbb{E}[1\{R \leq v\}|A, X] = \sum_{k=1}^{K} \psi_k(A_k, X, v)$, $\forall v$. For ease of notation, let $$Y_k = \frac{\pi(A^k \mid X)}{\mu_k(A^k \mid X)}.$$

Accordingly, $$E[G \cdot 1\{R \leq v\} \mid A, X] = \left(1 - K + \sum_{k=1}^{K} Y_k\right)\left(\sum_{k=1}^{K} \psi_k(A^k, X)\right) = $$

$$\sum_{k=1}^{K} Y_k \psi_k(A^k, X, v) + \sum_{k=1}^{K}\left(1 - K + \sum_{k=1}^{K} Y_j\right)\psi_k(A^k, X, v)$$

Take an expectation over $A \sim \mu(\cdot|X)$. It can be seen that the second term equals 0. Due to importance sampling, the first term equals $\mathbb{IE}\,\mathbb{E}_\pi[1\{R \leq v\}|X]$. Taking an expectation over $X \sim d_x(\cdot)$, by the total law of expectation, $$\mathbb{E}_\mu[G \cdot 1\{R \leq v\}] = \mathbb{E}_\pi[1\{R \leq v\}] = F^\pi(v)$$

As mentioned above, the slate policy learning system 106 can apply an estimator to generate a CDF for a new policy. This estimator employed by the slate policy learning system 106 in accordance with one or more embodiments is outlined in Algorithm 1:

---

Input: $\pi$, $\mu$, $v$, $\{(X_i, A_i, R_i)\}_{i=1}^n \sim D_n$
Output: $\hat{F}^\pi_n(v)$
1: $s_v = 0$
2: for $i = 1, 2, \ldots, n$ do 3: $\quad G_i \leftarrow 1 - K + \sum_{k=1}^{K} \frac{\pi(A_i^k|X_i)}{\mu_k(A_i^k|X_i)}$ 4: $\quad s_v \leftarrow s_v + 1\{R_i \leq v\} G_i$
5: end for
6: return $\hat{F}^\pi_n(v) = s_v/n$

---

Additionally, in the following theorem, it can be established that the slate policy learning system 106 leverages the additive structure to obtain an unbiased and pointwise consistent estimate of the CDF of the target slate recommendation policy.

Theorem 2. Under Assumption 1, $\hat{F}_n^\pi(v)$ is an unbiased and pointwise consistent estimator of $F^\pi(v)$.

Proof For Theorem 2. It can be shown that $\hat{F}_n^\pi(v)$ is an unbiased estimator of $F^\pi(v)$ by taking an expectation of $F^\pi(v)$ over datasets $D \sim \mu$, where (a) follows from Theorem 1.

$$\mathbb{E}_{D \sim \mu}\left[\frac{1}{n}\sum_{i=1}^{n} G_i 1\{R_i \leq v\}\right] \stackrel{(a)}{=} \frac{1}{n}\sum_{i=1}^{n} \mathbb{E}_\pi[1\{R_i \leq v\}] = F^\pi(v)$$

To establish almost sure convergence of the estimator, note that each data point in $D_n$ is i.i.d. Additionally, the magnitude of $G_i$ is bounded under the assumption of common support, since each slot-density ration can at most be $1/\epsilon$. As a result, the variance is $M_i := G_i 1\{R_i \leq v\}$ is bounded. Thus $M_i$'s are i.i.d with bounded variance. Using Kilmogorov's strong law of large numbers [26], $$\hat{F}_n^\pi(v) = \frac{1}{n}\sum_{i=1}^{n} M_i \stackrel{a.s.}{\to} \mathbb{E}\left[\frac{1}{n}\sum_{i=1}^{n} M_i\right] = F^\pi(v)$$

The slate policy learning system 106 estimator incurs significantly lower variance for target estimation. The slate policy learning system 106 estimator uses importance weights that are a sum of slot level density ratios as opposed to a product as can be used in some conventional methods. Particularly in the slate setting, conventional methods suffer from enormous variance and reduced effective sample size. The slate policy learning system 106 demonstrates gains on both aspects empirically. Importantly, the slate policy learning system 106 estimator does not require knowledge of the specific functions ($\psi_k$'s) in the decomposition of the conditional CDF in Assumption 1; in some implementations, the slate policy learning system 106 only assumes the existence of a set of such latent functions, and a corresponding additive decomposition of the conditional CDF, to attain unbiased estimation. Even in cases where the assumption is not satisfied, the slate policy learning system 106 performs robustly.

The slate policy learning system 106 generates an estimated target CDF, which can be used to compute metrics of interest as functions of the CDF (for example, mean, variance, VaR, CvaR, etc.) Some of these metrics are non-linear functions of the CDF (VaR, CVaR) and thus their sample estimates would be biased estimators. Thus, the slate policy learning system 106 generates an unbiased target CDF estimator, which serves to be a "one-shot" solution for most metrics of interest.

As shown in FIGS. 7A-E, in one or more implementations the slate policy learning system 106 demonstrates significant improvements over conventional systems. For instance, researchers evaluated the performance of an example implementation of the slate policy learning system 106 (denoted as SunO) in a range of slate recommendation settings, comparing its performance against UnO, a general estimator that does not make any structural assumptions. Researchers defined better performance as having lower estimation error and variance, along with improvement in sample efficiency. Researchers begin by evaluating the estimators on synthetic data that follows the additive CDF structure to corroborate theoretical results. The researchers then proceed to real-world data experiments and use the additively decomposable metric NDCG as the slate reward. Researchers tested their estimator on two publicly available datasets—MovieLens—

20M and Open Bandit Pipeline. Researchers then developed a procedure to construct a slate simulator from recommendation datasets like MovieLens. Researchers evaluated SUnO in settings where Assumption 1 and even the additive reward condition are not satisfied and observed that it demonstrates robust performance.

Algorithm 1 outlines the steps for estimating the target CDF at any reward value v (the reward, in general, takes on continuous real values and implementationally it is not practical to estimate the target CDF at all continuous values of v). In practice, researchers found that an empirical estimate of the CDF may be computed at discrete points over the range of rewards. In between those points, the value of the CDF is kept constant. Consequently, researchers computed the target CDF at evenly spaced points over the range of rewards for both estimators in the experiments that follow. The granularity of this discretization reflects in the granularity of the estimated CDF. To ensure accuracy and relative smoothness in the estimated CDF, researchers choose a fine level of discretization relative to the range of reward for each experiment. All the experiments have a factored uniform-random logging policy. The error bars denote one standard error.

The researchers begin by synthetically generating data where the slate reward follows the additive CDF structure (Assumption 1). Researchers considered the non-contextual bandit setting for ease of analysis, and the same may easily be extended to a contextual setting. To construct the data-generating reward distribution, slices of a sigmoid function are taken to correspond to the $\psi k$'s for each (A k). This manner of construction ensures that the resultant sum of the functions, the CDF, is a monotonic non-decreasing function. The $\psi k$'s are appropriately normalized. For these experiments, K=3, N=3 (possible number of actions in each slot). The slate policy learning system 106 chooses one action per slot deterministically where the action is randomly assigned at the start of the experiment and held constant for all experiments.

Figure 7B:
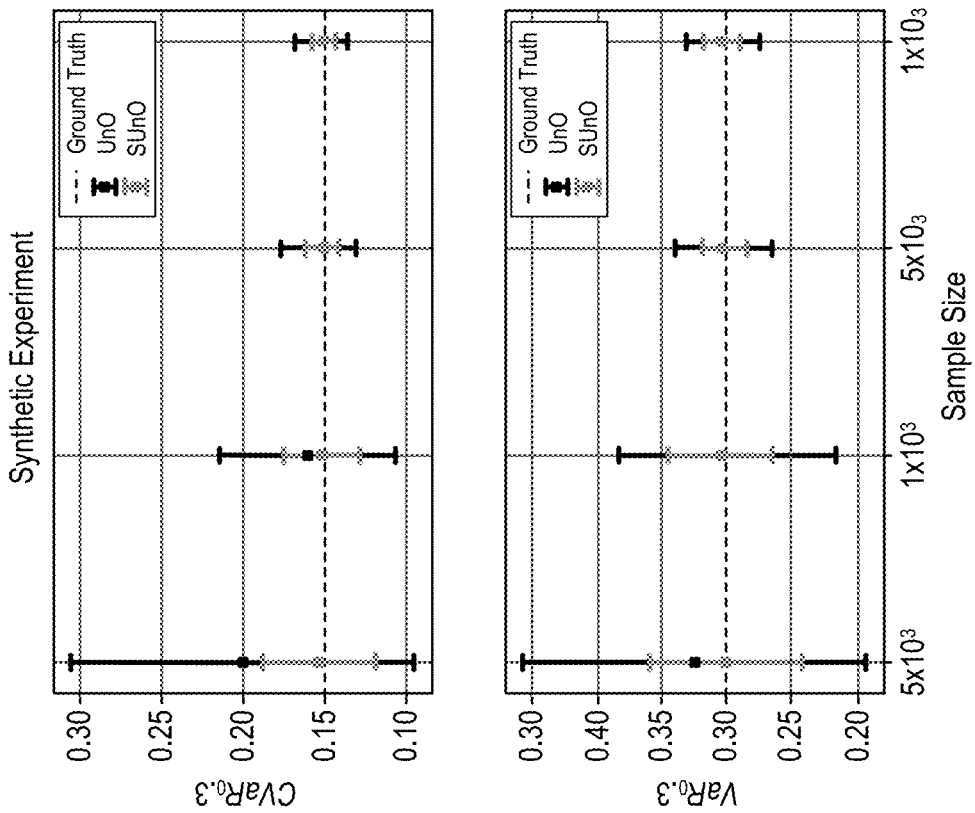
Figure 7A:
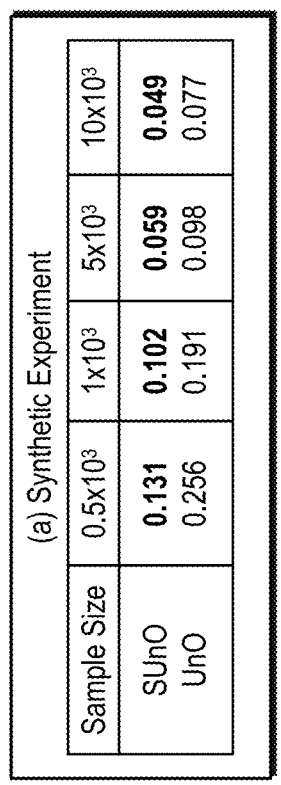

Researchers compared the performance of the estimators on two fronts, with the first being goodness-of-fit of CDF. Researchers report the average Kolmogorov-Smirnov statistic of the estimated target CDFs. Researchers computed the ground truth target CDF by executing the evaluation policy on the simulator. The second front is tail measures. Researchers computed the CVaR0.3 and VaR0.3 from the target CDFs estimated by the two estimators. The experiments were run for different logged data sizes and the results averaged over 1000 trials, as shown in FIGS. 7A-7B. Because the SunO utilized the structure in rewards, the example implementation of the slate policy learning system 106 estimated the CDF and the tail measures more accurately while being more sample efficient. Note that with an increase in sample size, both estimators tend to the true values as they are consistent and unbiased. The example implementation for the slate policy learning system 106 has a significantly lower variance in estimation as seen by the error bars in FIG. 7B.

Further, researchers introduced a procedure for converting a recommender system ratings dataset (like MovieLens) to a slate recommendation simulator with additive rewards and proceeded to evaluate the example implementation of the slate policy learning system 106. The procedure for constructing the simulator follows. First, researchers learned a user-item preference matrix B along with the user context embedding X. For m users and l item, $B \in R$ m×l and $X \in \{0, 1\}$m. Researchers then learned B from rating data. X is a binary vector that encodes user-item interaction history.

Then, to limit the setup to approximately 10 k unique users, researchers trimmed the set of users by retaining users that have an interaction history with 10 to 15 items. Next, researchers computed the ground truth preference scores for each user by computing the product of a user's context embedding with the preference matrix (x·B). Then, to make the simulator tractable, researchers trimmed the action set by retaining the top 20 preferred actions per user based on each user's ground truth scores (N=20). Finally, for a slate action A, researchers set a ranking metric like NDCG as the slate reward R.

In application, first, researchers set up a slate simulator as described above using the MovieLens dataset to estimate B and X. A uniform random factored logging policy is used for creating the dataset for evaluating the estimators. Researchers considered an ∈-greedy target policy, which, for each user, it picks the top K preferred actions (one per slot) with probability 1−N∈ and a uniform random action from the user's trimmed action set with probability ∈. Here K=5, ∈=0.1 and results were averaged over 50 trials. Researchers analyzed two metrics, with the first being goodness-of-fit of CDF, where researchers reported the average Kolmogorov-Smirnov statistic of the estimated CDFs against the ground truth CDF, with the ground truth CDF computed by executing the evaluation policy on the simulator. Researchers also analyzed the second metric of metrics computed from the CDF, computing the mean and 0.5-quantile (median) from the estimated CDF.

Figure 7D:
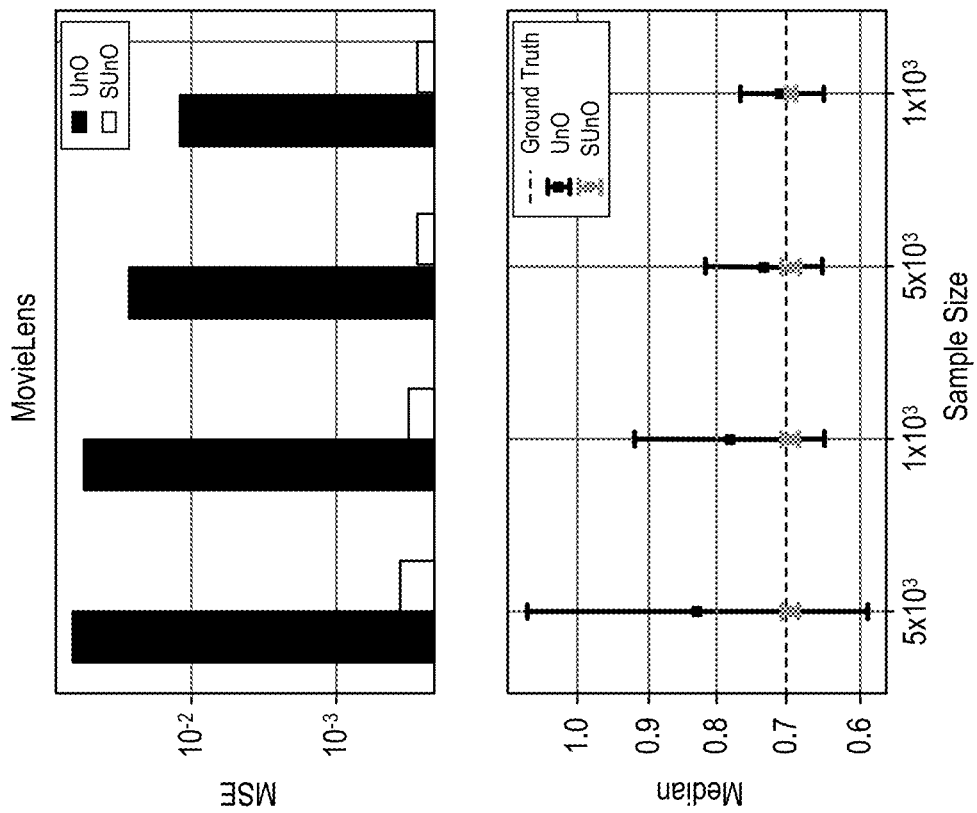
Figure 7C:
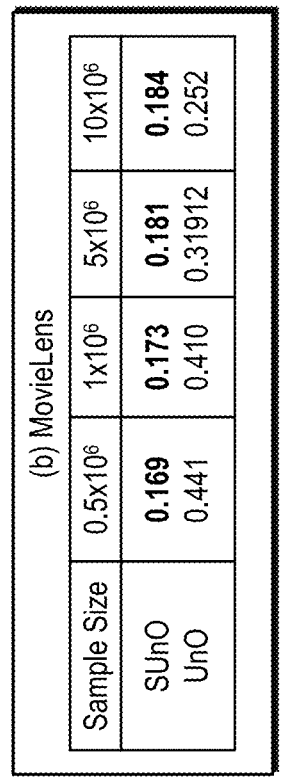

The experiments demonstrate that even in a setting where only the additive reward condition is met (and not Assumption 1), the example implementation for the slate policy learning system 106 (as denoted by SunO) more accurately estimates the target CDF with fewer samples than conventional systems (as denoted by UnO), as shown in FIGS. 7C-7D. Researchers found that the slate policy learning system 106 has a significantly lower estimation variance for metrics computed from the CDF, as seen by the error bars and the mean squared error in FIG. 7D (note that the mean squared error captures both the bias and variance in estimation).

Additionally, researchers evaluated the estimators in a setting where both the additive reward and CDF conditions are violated. Researchers simulated this setting using the Open Bandit Pipeline (OBP) slate bandit simulator that uses a synthetic slate reward model, which models higher-order interactions among slot actions and thus violates Assumption 1 as well as the additive slate reward structure. Researchers used the cascade additive reward model in OBP for these experiments, where, similar to the MovieLens experiments, researchers observed the estimation error for the target mean computed from the estimated CDF. Researchers set K=3, N=10, and the results were averaged over 10 trials.

In this setting, researchers did not expect unbiased estimates of the mean from the slate policy learning system 106 (denoted as SunO), even though it is a linear function of the CDF. Nonetheless, as shown in FIG. 7E, the example implementation of the slate policy learning system 106 continues to perform significantly better in terms of bias and variance as evaluated with MSE compared to conventional systems (denoted as UnO) which does not make any structural assumptions and is an unbiased estimator (K is set to a relatively small value and a large gap in performance between the two estimators can be expected larger K).

Figure 8:
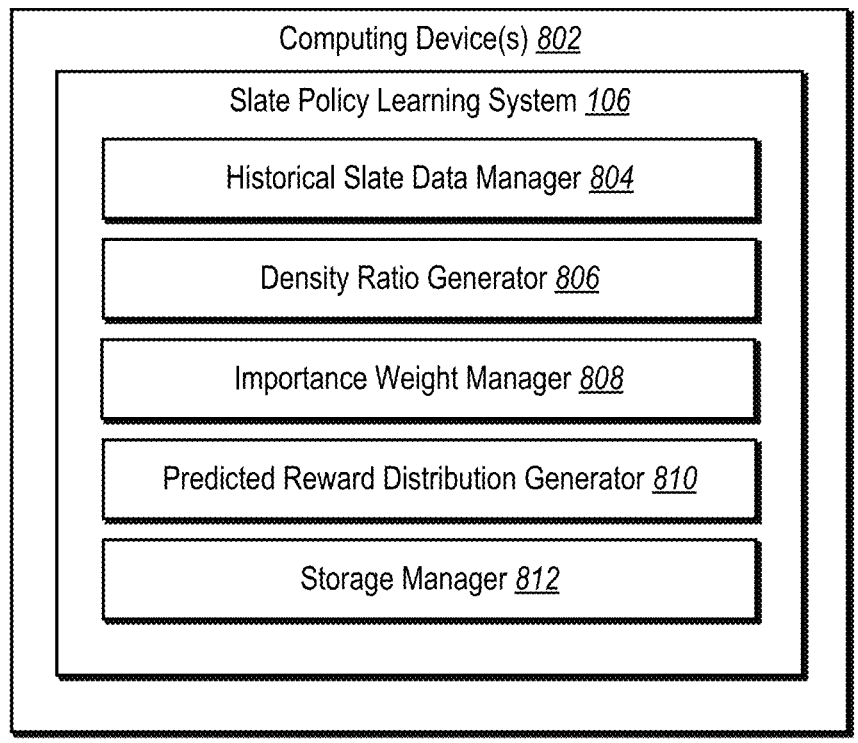
FIG. 8 illustrates a schematic diagram of an example architecture of the slate policy learning system in accordance with one or more embodiments of the present disclosure.

Looking now to FIG. 8, additional detail will be provided regarding components and capabilities of the slate policy learning system 106. Specifically, FIG. 8 illustrates a FIG.

800 of an example schematic diagram of the slate policy learning system 106 on an example computing device 802 (e.g., one or more of the client device 114, the administrator device 112, the database 108 and/or the server(s) 102). In some embodiments, the computing device 802 refers to a distributed computing system where different managers are located on different devices, as described above. As shown in FIG. 8, the slate policy learning system 106 includes a historical slate data manager 804, a density ratio generator 806, an importance weight manager 808, a predicted reward distribution generator 810, and a storage manager 812.

As just mentioned, the slate policy learning system 106 includes a historical slate data manager 804. In particular, the historical slate data manager 804 manages, stores, gathers, and identifies historical slot data corresponding to digital slates. For example, the historical slate data manager 804 collates a collection of online slate actions and slate-level rewards to train future slate recommendation policies (e.g., as described above in relation to FIG. 3).

As shown, the slate policy learning system 106 also includes a density ratio generator 806. In particular, the density ratio generator 806 generates, maintains, stores, accesses, provides, or determines slot-level density ratios associated with comparing the historical slot-level data with the slot-level data generated by a slate recommendation policy. In some cases, the density ratio generator 806 determines density ratios by dividing slot-level probabilities for slot-level actions generated by the slate recommendation policy by slot-level probabilities for slot-level actions stored as historical slot-level data (e.g., as described above in relation to FIG. 4).

Additionally, the slate policy learning system 106 also includes an importance weight manager 808. In particular, the importance weight manager 808 manages, maintains, stores, accesses, provides, determines, or generates importance weights associated with the online data collected. For example, the importance weight manager 808 combine slot-level density ratios for digital slates to determine slate-level importance weights (e.g., as described above in relation to FIG. 5).

As illustrated in FIG. 8, the slate policy learning system 106 includes a predicted reward distribution generator 810. In particular, the predicted reward distribution generator 810 generates, manages, determines, stores, or presents a predicted reward distribution. In some cases, the predicted reward distribution generator 810 generates a graphical representation of a predicted reward distribution, which in one or more embodiments includes a cumulative distribution function or a probability density function (e.g., as described in relation to FIG. 6). Further, the predicted reward distribution generator 810, in one or more embodiments, may present or surface a generated graphical representation of a predicted reward distribution to a device, such as the administrator device 112 or the client device 114.

The slate policy learning system 106 further includes a storage manager 812. The storage manager 812 operates in conjunction with or includes one or more memory devices such as the database 108 that store various data such as historical slate data, importance weights, density ratios, or predicted reward distributions.

Each of the components 804-812 of the slate policy learning system 106 can include software, hardware, or both. For example, the components 804-812 can include one or more instructions stored on a computer-readable storage medium and executable by processors of one or more computing devices, such as a client device or server device. When executed by the one or more processors, the computer-executable instructions of the slate policy learning system 106 can cause the computing device(s) to perform the methods described herein. Alternatively, the components 804-812 can include hardware, such as a special-purpose processing device to perform a certain function or group of functions. Alternatively, the components 804-812 of the slate policy learning system 106 can include a combination of computer-executable instructions and hardware.

Furthermore, the components 804-812 of the slate policy learning system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 804-812 may be implemented as a stand-alone application, such as a desktop or mobile application. Furthermore, the components 804-812 may be implemented as one or more web-based applications hosted on a remote server. The components 804-812 may also be implemented in a suite of mobile device applications or "apps." To illustrate, the components 804-812 may be implemented in an application, including but not limited to, applications in ADOBE® EXPERIENCE MANAGER and ADVERTISING CLOUD®, such as ADOBE ANALYTICS®, ADOBE JOURNEY OPTIMIZER, ADOBE AUDIENCE MANAGER®, and MARKETO®. "ADOBE," "ADOBE EXPERIENCE MANAGER," "ADVERTISING CLOUD," "ADOBE ANALYTICS," "ADOBE AUDIENCE MANAGER," and "MARKETO" are either registered trademarks or trademarks of Adobe Inc. in the United States and/or other countries.

FIGS. 1-8, the corresponding text, and the examples provide a number of different systems, methods, and non-transitory computer readable media for evaluating slate recommendation policies. For example, FIG. 9 illustrates a flowchart of an example sequences or series of acts in accordance with one or more embodiments.

Figure 9:
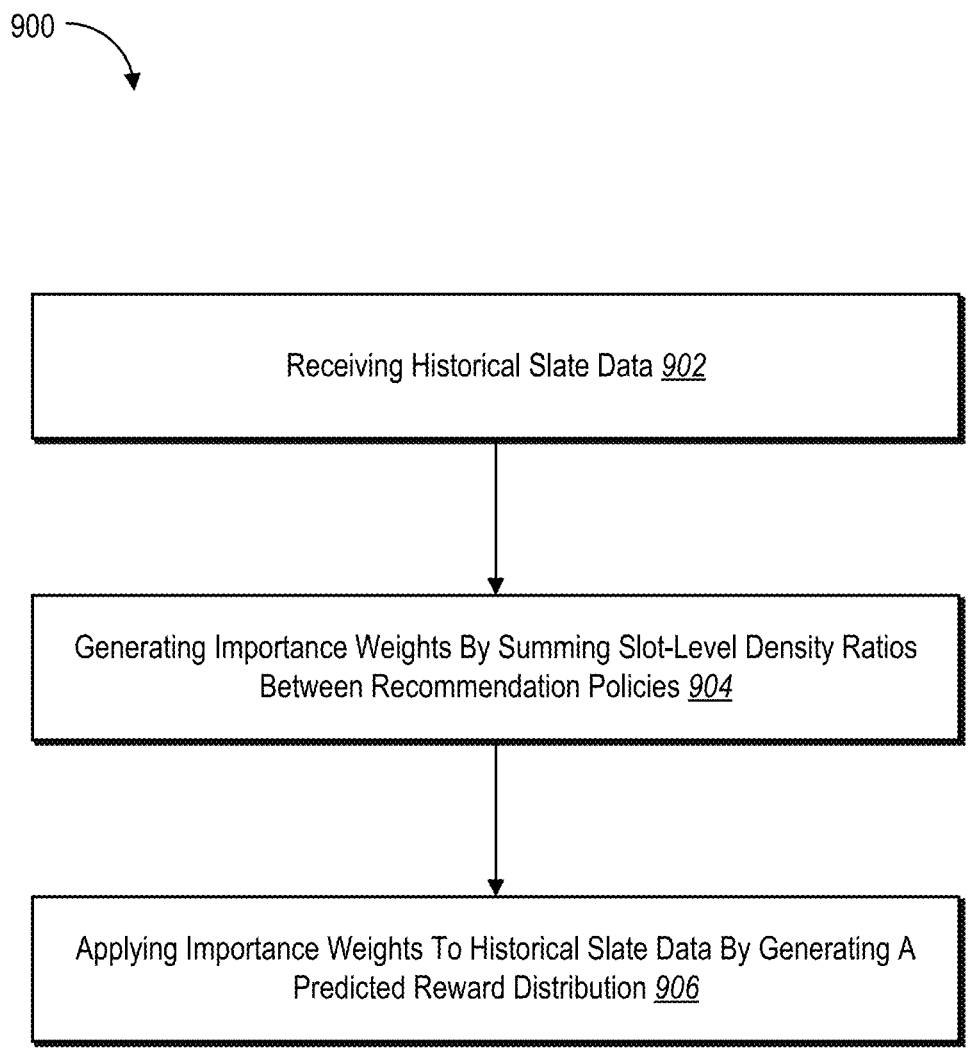
FIG. 9 illustrates a series of acts for utilizing slot-level density ratio summation in evaluating a slate recommendation policy in accordance with one or more embodiments of the present disclosure.

While FIG. 9 illustrates acts according to particular embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for evaluating slate recommendation policies. In particular, the series of acts 900 includes an act 902 of receiving historical slate data, an act 904 of generating importance weights by summarizing slot-level density ratios between recommendation policies, and an act 906 of applying importance weights to historical slate data to generate a predicted reward distribution.

In some embodiments, the act 902 includes receiving historical slate data comprising observed rewards from selecting slate actions for a plurality of digital slots of a digital slate utilizing a first slate recommendation policy. Moreover, the act 904 includes generating, for a second slate recommendation policy, a plurality of importance weights from the historical slate data by summing slot-level density ratios between the first slate recommendation policy and the second slate recommendation policy for the slate actions. In addition, the act 906 includes generating a predicted reward distribution for the second slate recommendation policy by applying the plurality of importance weights to the historical slate data for the first slate recommendation policy.

In one or more implementations, the series of acts 900 includes generating the plurality of importance weights by: determining, for a slate action, a first slot-level density ratio between the first slate recommendation policy and the second slate recommendation policy for a first slot of the digital slate; determining, for the slate action, a second slot-level density ratio between the first slate recommendation policy and the second slate recommendation policy for a second slot of the digital slate; and summing the first slot-level density ratio and the second slot-level density ratio to determine an importance weight for the slate action. Moreover, in one or more implementations, the series of acts 900 includes generating the plurality of importance weights by summing, for an additional slate action, slot-level density ratios for the plurality of digital slots to generate an additional importance weight.

Further, in one or more implementations, the series of acts 900 includes generating the slot-level density ratios by: determining a first slot-level probability of selecting a first slot-level action utilizing the first slate recommendation policy; and determining a second slot-level probability of selecting the first slot-level action utilizing the second slate recommendation policy. In addition, in one or more implementations, the series of acts 900 includes generating the slot-level density ratios by generating a first slot-level density ratio from the first slot-level probability and the second slot-level probability.

In one or more implementations, the series of acts 900 includes receiving the historical slate data by receiving a client device context analyzed by the first slate recommendation policy in selecting the slate actions, and further includes: determining, from the historical slate data, a client device context embedding from a plurality of client device context embeddings utilized to select the first slot-level action; and determining the second slot-level probability of selecting the first slot-level action utilizing the second slate recommendation policy in light of the client device context embedding. Moreover, in one or more implementations, the series of acts 900 includes determining the first slot-level probability of selecting the first slot-level action utilizing the first slate recommendation policy in light of the client device context.

Further, in one or more implementations, the series of acts 900 includes generating the predicted reward distribution for the second slate recommendation policy comprises generating a cumulative distribution function by applying the plurality of importance weights to the observed rewards from the historical slate data. In one or more implementations the acts 902-906 include storing and/or accessing historical slate data comprising observed rewards from selecting slate actions for a plurality of digital slots of a digital slate utilizing a first digital policy; generating, for a second digital policy, a plurality of importance weights from the historical slate data by: summing, for a first slate action, a first plurality of slot-level density ratios for the plurality of digital slots to generate a first importance weight; and summing, for a second slate action, a second plurality of slot-level density ratios for the plurality of digital slots to generate a second importance weight; and generating a predicted reward distribution for the second digital policy by applying the plurality of importance weights to the historical slate data.

For example, in one or more implementations, the series of acts 900 includes generating the first plurality of slot-level density ratios by: determining, for the first slate action, a first slot-level probability of selecting a first slot-level action for a first slot utilizing the first digital policy; determining, for the first slate action, a second slot-level probability of selecting the first slot-level action for the first slot utilizing the second digital policy; and generating a first slot-level density ratio from the first slot-level probability and the second slot-level probability.

Further, in one or more implementations, the series of acts 900 includes generating the first plurality of slot-level density ratios by: determining, for the first slate action, a third slot-level probability of selecting a second slot-level action for a second slot utilizing the first digital policy; and determining, for the first slate action, a fourth slot-level probability of selecting the second slot-level action for the second slot utilizing the second digital policy. In addition, in one or more implementations, the series of acts 900 includes generating the first plurality of slot-level density ratios by generating a second slot-level density ratio from the third slot-level probability and the fourth slot-level probability.

Moreover, in one or more implementations, the series of acts 900 includes generating the first importance weight for the first slate action by summing the first slot-level density ratio and the second slot-level density ratio. In one or more implementations, the historical slate data comprises client device context data analyzed by the first digital policy in selecting the slate actions and the series of acts 900 includes determining the first slot-level probability of selecting the first slot-level action utilizing the first digital policy in light of a first client device context from the client device context data. Further, in one or more implementations, the series of acts 900 includes generating the predicted reward distribution for the second digital policy by generating a cumulative distribution function from the plurality of importance weights and the observed rewards from the historical slate data.

In one or more implementations the acts 902-906 include receiving historical slate data comprising observed rewards from selecting slate actions for a plurality of slots of a digital slate utilizing a first digital policy; generating, for a second digital policy, a plurality of importance weights from the historical slate data corresponding to the first digital policy by: determining, for a slate action, a first slot-level density ratio between the first digital policy and the second digital policy for a first slot of the digital slate; determining, for the slate action, a second slot-level density ratio between the first digital policy and the second digital policy for a second slot of the digital slate; and summing the first slot-level density ratio and the second slot-level density ratio to determine an importance weight for the slate action; and generating a predicted reward distribution for the second digital policy by applying the plurality of importance weights to the historical slate data.

For instance, in one or more implementations, the series of acts 900 includes generating the plurality of importance weights by summing, for an additional slate action, a third slot-level density ratio for the first slot of the digital slate and a fourth slot-level density ratio for the second slot of the digital slate to generate an additional importance weight. Further, in one or more implementations, the series of acts 900 includes determining the first slot-level density ratio between the first digital policy and the second digital policy for the first slot of the digital slate comprises determining a first slot-level probability of selecting a first slot-level action utilizing the first digital policy in light of a client device context.

Moreover, in one or more implementations, the series of acts 900 includes determining the first slot-level density ratio between the first digital policy and the second digital policy for the first slot of the digital slate by: determining a second slot-level probability of selecting the first slot-level action utilizing the second digital policy in light of the client device context; and determining the first slot-level density ratio by summing the first slot-level probability and the second slot-level probability. In addition, in one or more implementations, the series of acts 900 includes generating the predicted reward distribution for the second digital policy comprises generating at least one of a cumulative distribution function or a probability density function from the plurality of importance weights and the observed rewards.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
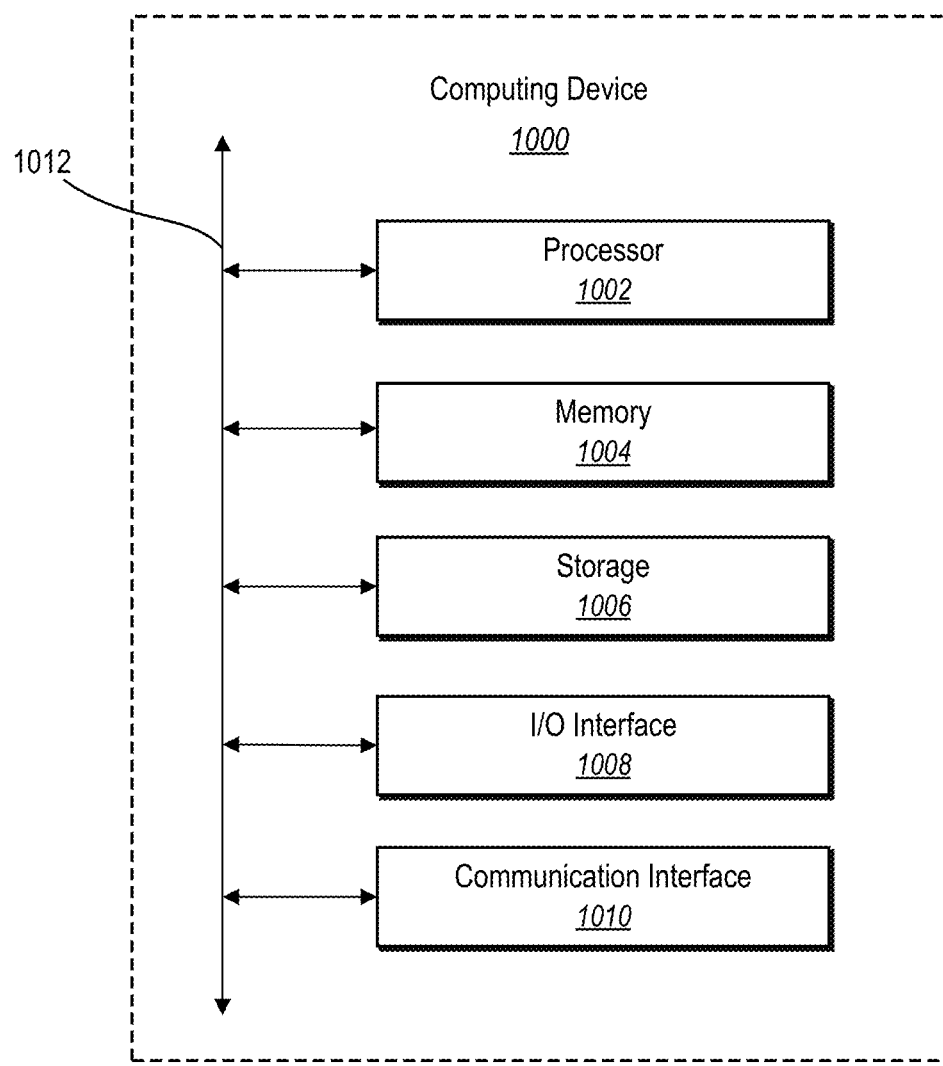
FIG. 10 illustrates a block diagram of an example computing device in accordance with one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 802, server 102, administrator device 112, and client device(s) 114). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving historical slate data comprising observed rewards from selecting slate actions for a plurality of digital slots of a digital slate utilizing a first slate recommendation policy;
generating, for a second slate recommendation policy, a plurality of importance weights from the historical slate data by summing slot-level density ratios between the first slate recommendation policy and the second slate recommendation policy for the slate actions; and
generating a predicted reward distribution for the second slate recommendation policy by applying the plurality of importance weights to the historical slate data for the first slate recommendation policy.

2. The computer-implemented method of claim 1, wherein generating the plurality of importance weights comprises:
  determining, for a slate action, a first slot-level density ratio between the first slate recommendation policy and the second slate recommendation policy for a first slot of the digital slate;
  determining, for the slate action, a second slot-level density ratio between the first slate recommendation policy and the second slate recommendation policy for a second slot of the digital slate; and
  summing the first slot-level density ratio and the second slot-level density ratio to determine an importance weight for the slate action.

3. The computer-implemented method of claim 2, wherein generating the plurality of importance weights comprises summing, for an additional slate action, slot-level density ratios for the plurality of digital slots to generate an additional importance weight.

4. The computer-implemented method of claim 1, wherein generating the slot-level density ratios comprises:
  determining a first slot-level probability of selecting a first slot-level action utilizing the first slate recommendation policy; and
  determining a second slot-level probability of selecting the first slot-level action utilizing the second slate recommendation policy.

5. The computer-implemented method of claim 4, wherein generating the slot-level density ratios comprises generating a first slot-level density ratio from the first slot-level probability and the second slot-level probability.

6. The computer-implemented method of claim 4, wherein receiving the historical slate data further comprises receiving a client device context analyzed by the first slate recommendation policy in selecting the slate actions, and further comprising:
  determining, from the historical slate data, a client device context embedding from a plurality of client device context embeddings utilized to select the first slot-level action; and
  determining the second slot-level probability of selecting the first slot-level action utilizing the second slate recommendation policy in light of the client device context embedding.

7. The computer-implemented method of claim 6, further comprising determining the first slot-level probability of selecting the first slot-level action utilizing the first slate recommendation policy in light of the client device context.

8. The computer-implemented method of claim 7, wherein generating the predicted reward distribution for the second slate recommendation policy comprises generating a cumulative distribution function by applying the plurality of importance weights to the observed rewards from the historical slate data.

9. A system comprising:
  one or more memory devices comprising historical slate data comprising observed rewards from selecting slate actions for a plurality of digital slots of a digital slate utilizing a first digital policy; and
  one or more processors configured to cause the system to:
  generate, for a second digital policy, a plurality of importance weights from the historical slate data by:
    summing, for a first slate action, a first plurality of slot-level density ratios for the plurality of digital slots to generate a first importance weight; and
    summing, for a second slate action, a second plurality of slot-level density ratios for the plurality of digital slots to generate a second importance weight; and
  generate a predicted reward distribution for the second digital policy by applying the plurality of importance weights to the historical slate data.

10. The system of claim 9, wherein the one or more processors are configured to cause the system to generate the first plurality of slot-level density ratios by:
  determining, for the first slate action, a first slot-level probability of selecting a first slot-level action for a first slot utilizing the first digital policy;
  determining, for the first slate action, a second slot-level probability of selecting the first slot-level action for the first slot utilizing the second digital policy; and
  generating a first slot-level density ratio from the first slot-level probability and the second slot-level probability.

11. The system of claim 10, wherein the one or more processors are configured to cause the system to generate the first plurality of slot-level density ratios by:
  determining, for the first slate action, a third slot-level probability of selecting a second slot-level action for a second slot utilizing the first digital policy; and
  determining, for the first slate action, a fourth slot-level probability of selecting the second slot-level action for the second slot utilizing the second digital policy.

12. The system of claim 11, wherein the one or more processors are configured to cause the system to generate the first plurality of slot-level density ratios by generating a second slot-level density ratio from the third slot-level probability and the fourth slot-level probability.

13. The system of claim 12, wherein the one or more processors are configured to cause the system to generate the first importance weight for the first slate action by summing the first slot-level density ratio and the second slot-level density ratio.

14. The system of claim 10, wherein the historical slate data comprises client device context data analyzed by the first digital policy in selecting the slate actions and wherein the one or more processors are further configured to cause the system to determine the first slot-level probability of selecting the first slot-level action utilizing the first digital policy in light of a first client device context from the client device context data.

15. The system of claim 9, wherein the one or more processors are configured to cause the system to generate the predicted reward distribution for the second digital policy by generating a cumulative distribution function from the plurality of importance weights and the observed rewards from the historical slate data.

16. A non-transitory computer readable medium storing executable instructions which, when executed by a processing device, cause the processing device to perform operations comprising:
  receiving historical slate data comprising observed rewards from selecting slate actions for a plurality of slots of a digital slate utilizing a first digital policy;
  generating, for a second digital policy, a plurality of importance weights from the historical slate data corresponding to the first digital policy by:
    determining, for a slate action, a first slot-level density ratio between the first digital policy and the second digital policy for a first slot of the digital slate;

determining, for the slate action, a second slot-level density ratio between the first digital policy and the second digital policy for a second slot of the digital slate; and summing the first slot-level density ratio and the second slot-level density ratio to determine an importance weight for the slate action; and generating a predicted reward distribution for the second digital policy by applying the plurality of importance weights to the historical slate data.

17. The non-transitory computer readable medium of claim 16, wherein generating the plurality of importance weights comprises summing, for an additional slate action, a third slot-level density ratio for the first slot of the digital slate and a fourth slot-level density ratio for the second slot of the digital slate to generate an additional importance weight.

18. The non-transitory computer readable medium of claim 16, wherein determining the first slot-level density ratio between the first digital policy and the second digital policy for the first slot of the digital slate comprises determining a first slot-level probability of selecting a first slot-level action utilizing the first digital policy in light of a client device context.

19. The non-transitory computer readable medium of claim 18, wherein determining the first slot-level density ratio between the first digital policy and the second digital policy for the first slot of the digital slate comprises:

determining a second slot-level probability of selecting the first slot-level action utilizing the second digital policy in light of the client device context; and determining the first slot-level density ratio by summing the first slot-level probability and the second slot-level probability.

20. The non-transitory computer readable medium of claim 16, wherein generating the predicted reward distribution for the second digital policy comprises generating at least one of a cumulative distribution function or a probability density function from the plurality of importance weights and the observed rewards.

* * * * *